(12) United States Patent
Saigh

(10) Patent No.: US 8,015,069 B2
(45) Date of Patent: Sep. 6, 2011

(54) SYSTEM AND METHOD FOR ASSET UTILIZATION

(75) Inventor: Michael Saigh, Las Cruces, NM (US)

(73) Assignee: Autocart LLC, St. Louis, MO (US)

( * ) Notice: Subject to any disclaimer, the term of this patent is extended or adjusted under 35 U.S.C. 154(b) by 938 days.

(21) Appl. No.: 11/986,190

(22) Filed: Nov. 20, 2007

(65) Prior Publication Data

US 2008/0120216 A1 May 22, 2008

Related U.S. Application Data

(60) Provisional application No. 60/860,208, filed on Nov. 20, 2006, provisional application No. 60/903,894, filed on Feb. 27, 2007.

(51) Int. Cl.
*G06Q 30/00* (2006.01)
(52) U.S. Cl. ..................................................... 705/26.1
(58) Field of Classification Search .................... 705/26, 705/26.1
See application file for complete search history.

(56) References Cited

U.S. PATENT DOCUMENTS 7,415,471 B1 * 8/2008 Coleman ............................... 1/1
2009/0187512 A1 * 7/2009 Giroux et al. ................. 705/36 T

OTHER PUBLICATIONS

Matchmaking for Buyers, Sellers of Small Businesses Series, The Washington Post (pre-1997 Fulltext). Washington, D.C.: Oct. 19, 1992. p. f.09 http://proquest.umi.com/pqdweb?did=74056867&sid=3&Fmt=3&clientId=19649&RQT=309&VName=PQD.*

* cited by examiner

*Primary Examiner* — Mila Airapetian

(57) ABSTRACT

The present invention is a computer system or method for obtaining, maintaining and controlling an exchange of tangible assets over a global computer network. In one embodiment, the present invention is a computer system having memory, the system being adapted to identify one or more art assets which may be categorized into a collective art asset pool, to obtain an initial appraisal value for the art asset pool from third party appraisers or from an automated appraisal process, to calculate an appraisal value for the art asset based upon the appraisal information it obtained, to obtain orders from potential investors and/or brokers, process such orders, to continuously monitor art asset value against appraisal information, and is further adapted to automatically switch ownership units amongst art asset pools based upon predefined triggering threshold events. The present invention creates a dynamic buy-sell environment for art assets over a global computer network which utilizes typically non-utilized art assets in a way that creates demand and appreciation, while concurrently having little or no change or impact on the control and use of the actual art asset.

27 Claims, 14 Drawing Sheets

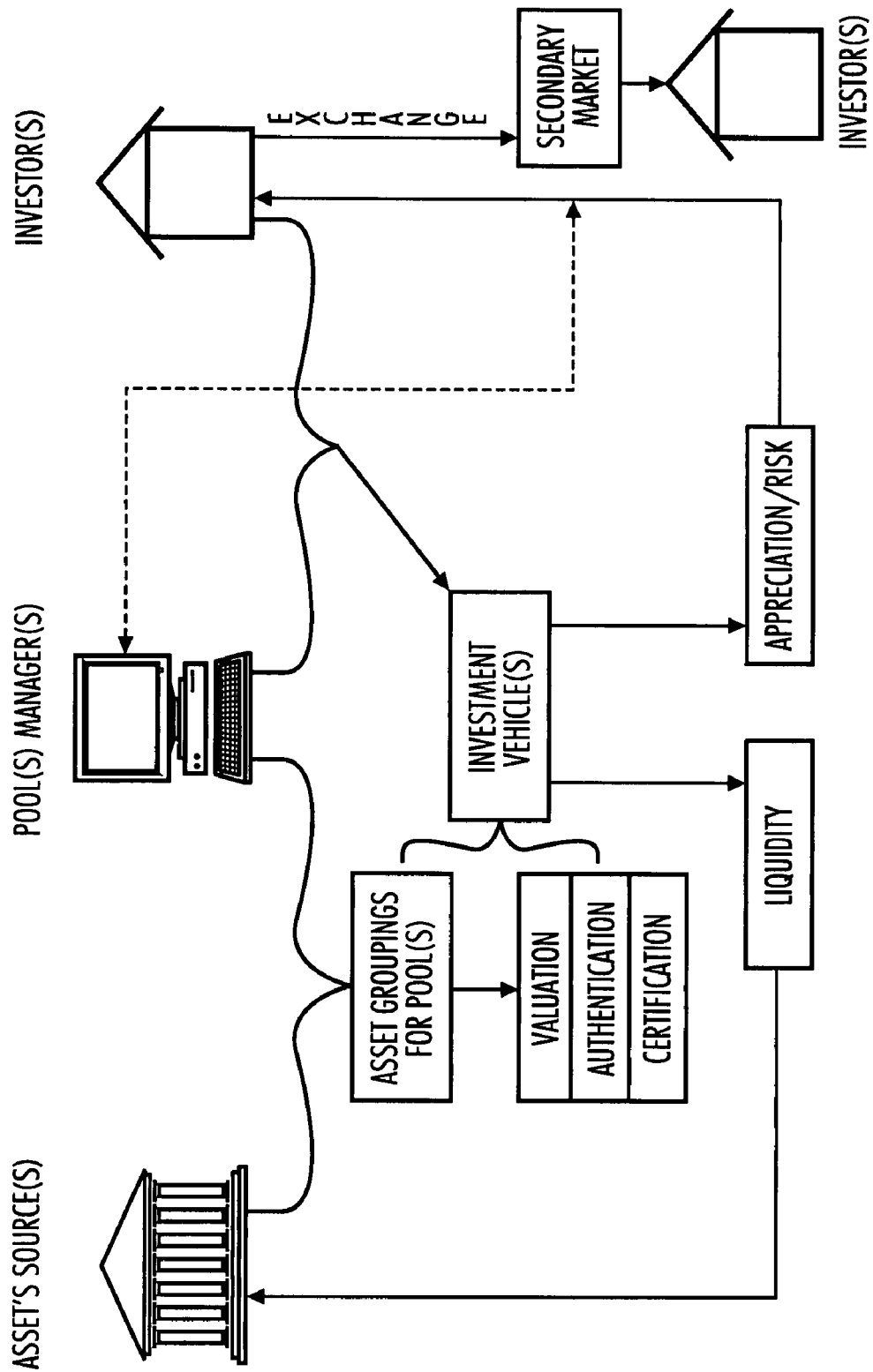
FIG. 4 Art Asset Allocation Transactional Schematic

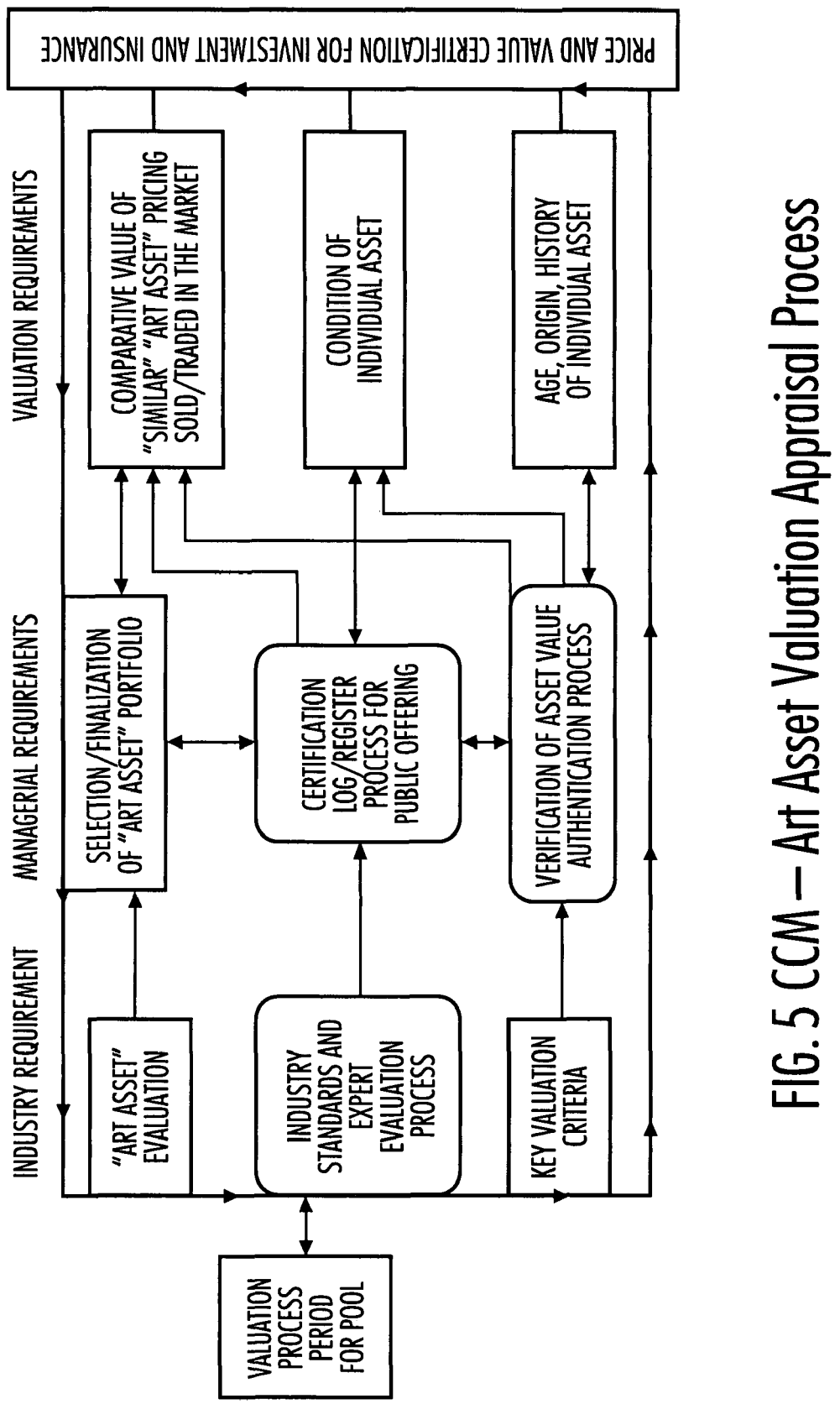
FIG. 5 CCM – Art Asset Valuation Appraisal Process

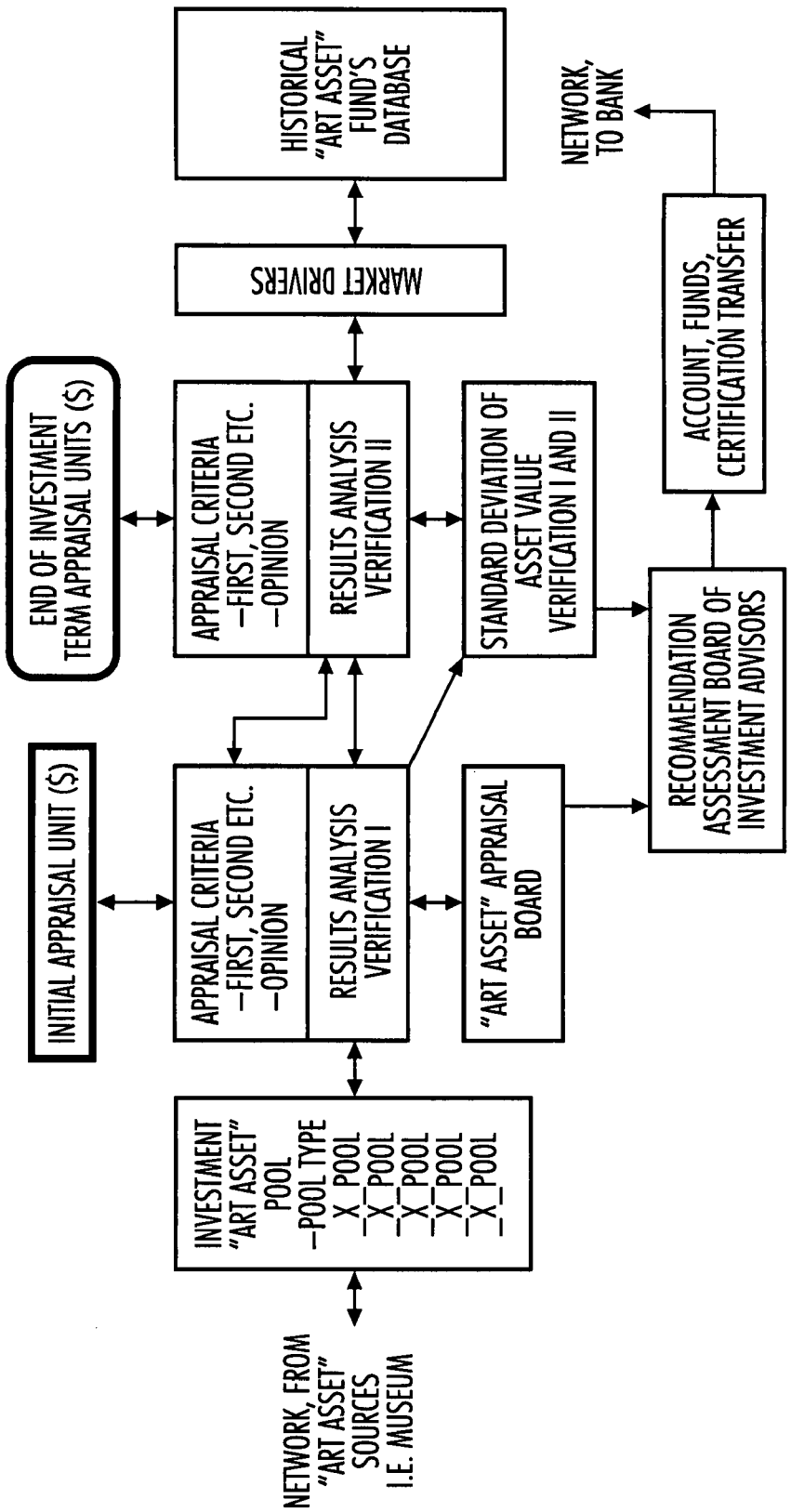
FIG. 6a CCM – Investment Period's Appreciation Deviation Based on Appraisal FIG. 8 Increasing Demand Situation FIG. 9 Decreasing Demand Situation FIG. 10 Level Demand Situation

SYSTEM AND METHOD FOR ASSET UTILIZATION

CLAIM OF PRIORITY

The present invention claims priority based upon U.S. Provisional Patent Application No. 60/860,208, filed Nov. 20, 2006 to Saigh et al. titled "System and Method for Asset Utilization", and U.S. Provisional Patent Application No. 60/903,894, filed Feb. 27, 2007 to Saigh et al. titled "System and Method for Asset Utilization 2", both of which are hereby incorporated by reference.

FIELD OF INVENTION

The present invention relates generally to a software program operable on a computer system and in communication with other computer systems over a network, the software adapted to control, maintain, track, coordinate and operate a tangible investment exchange process over a global computer network, all in approximately real-time. The software controls the investment exchange process by, in one embodiment, obtaining a series of actual current appraisals for each "art asset" or "art asset pools" over a computer network. In another embodiment, the software may not need an initial appraisal, and instead, generate its own initial art asset value. Thereafter, the present invention may create, maintain and control a variety of investment art asset pools as the secondary market develops, thereby allowing the market to drive the value of each art asset pool to a market driven approach based on demand. In one embodiment, various art asset investment pools will carry various degrees of risk management and will be collectively tracked through the Central Control Manager software (the "CCM system"). The CCM system will coordinate the governance of each art asset pool as it relates to location, ownership and ownership percentages, replication, pricing, trading, replication, liquidity, secondary market, pool size and any other investment, management and ownership requirements, issues or features, as the pool construction dictates.

BACKGROUND OF THE INVENTION

The present invention relates to software which is adapted to obtain, control, maintain, and coordinate various investment methodologies for stagnate, underutilized and/or not utilized tangible asset or assets that have a monetary value. Typically, many tangible assets of value (e.g., art paintings, rare sculptures) are either stored, or exhibited in art museums, or are owned by governmental controlled collectibles, libraries, art and antiquities dealers, auction and consignment houses, galleries or in other private and other public collections (generally referred to herein as the "art holders"). In some cases, these art holders exhibit the art asset to the public (such as, for example, a museum). In other cases, these art holders will showcase the art only to selected individuals or groups due to the uniqueness, monetary value or historical value of the art asset (such as, for example, the artifacts found with or alongside the King Tut collection). In still other cases, some art holders decide not the showcase the art asset at all, and instead, place the art asset in private locations (such as a rare painting placed or stored in a residence or storage).

In many cases, museums warehouse a large percentage of their art assets for display within the museum as an exhibit, gallery or other forms of display to the general public. However, while the art asset may be valuable and increasing in value with time, museums typically have a hard time taking advantage of the value or increasing value of their art assets. Indeed, it is well known that museums are continually in search of financial sources to maintain its art asset collection, obtain new art asset collections, and/or obtain funding to either increase the size of the museum or increase the type of events offered to the public. Stated differently, private collectors, owners of rarities, owners of historical properties, public collectors, art museums, historical museums, transportation museums and other types of museums or owners of assets having inherent value currently raise capital for purchasing art work, investing in new exhibits and for general working capital needed for the curators, directors, workers and security teams needed to operate the museum. Rarities, as that term is used herein, includes those items whose value is based on historical presence, or one which is typically non-reproducible and having a value due to its uniqueness. Currently, museums and other exhibitors of all art forms must raise financial capital from private donations, contributions and from governmental sources. Museums, for example, compete for donations with other worthy causes, such as hospitals, childcare and other organizations for capital. Furthermore, most museums, given shortfalls in governmental appropriation and budget reductions, must rely on donations from companies and individuals. And, art holders face further monetary crisis during times of recession, because during such times, companies, individuals, investment trusts and other financial contributors reduce their donations under the belief that art assets do not provide the liquidity required.

There are further risks for art holders. For example, art holders typically do not look to short term and long term debt and other debt vehicles as a potential funding source because of the high risk associated with such vehicles. Moreover, art holders typically do not look to venture capital and similar sources of funding because such funding is considered too risky for most public institutions in the industry as well as for most private collectors. The resulting restrictions in terms of budget cuts, budget cutbacks and financial restrictions due to high risk or governmental restrictions prevent museums, artists and other art holders from expansion, opportunity and financial gain.

Additionally, it is difficult for the art holder to sell or transfer art to other art holders because there is no centralized system in which to offer and/or view art assets which are available. However, it is clear that one's art asset portfolio has the potential to significantly increase one's capital investment in the art asset while at the same time, allowing one to continue an ownership share of the art asset and allowing one to continue sharing the art asset with the public.

Prior to the present invention, investment opportunities with sufficient liquidity have generally been limited to equities and fixed income with real estate finding its way into portfolios with the advent of real estate investment trusts ("REITS"). Moreover, prior to the present invention, art assets were valued (or, appraised) through a subjective process, usually with no to little data points (primarily due to the fact that art assets are geographically diverse, and the appraisers have no way of centrally sharing appraisal values with other appraisers or viewing a central repository of such information). The present invention aims to assist such art holders by providing art asset owners (and potential art asset owners) a computerized method and system for (without limitation) storing, sharing, selling or owning art assets on a worldwide basis, while at the same time providing sufficient liquidity in the art asset. Moreover, the present invention aims to assist art holders with initially identifying the appraisal value of the art asset through a grading process with input from appraisers from throughout the world to provide numerous appraisal data points in a central repository database, and through subsequent public demand, move the initial appraisal value of the art asset in to a market driven value, thereby significantly increasing the overall value of the art asset or art asset pool. Additionally, the present invention will help combine an art holder's desire to obtain additional financing with a party who desires to obtain an ownership interest in art without having to worry about physically storing or maintaining the art, and allows the art investor to more appreciate the art because the art investor is now a part-owner of the art.

One common problem among art owners is that they desire additional funding based on the art asset, but they do not want to relinquish physical control, possession or entire ownership over the art asset. The present invention solves this problem by allowing the art holder, through the implementation of a computer software system, to obtain financing from one or more investors for an ownership interest one or more art assets, while still allowing the art holder to maintain physical possession and control of the art asset. Thus, in the example of a museum, the museum may give up some ownership interest in the art asset while being able to maintain physical control and possession of the art asset (thereby, allowing the public to continue to view and appreciate the art asset). As recited throughout this invention, this invention is not limited to a single art asset, but can be applied to numerous art assets which are placed collectively into an art asset pool. Thus, the present invention provides the ability for an investor to invest not only in a single art asset, but to invest in one or more art asset pools. By analogy, the present invention is directed towards creating a mutual fund for art investors, allowing the art investor to obtain ownership rights in an art asset (or, art asset pool) without obtaining possessory rights of the art asset (or, art assets in the pool).

The present invention is intended for use with all art assets which are tangible in nature. Representative tangible assets as used in this invention, in one preferred embodiment, include paintings, drawings, sculptures and photographs. In another embodiment, representative assets could also include rare books and manuscripts, historical sites, furniture (antiques) and decorative arts, rare stamps and coins (both rare coins, bullion, precious metals, precious stones and other and all types of like commodities) ancient artifacts, pottery and glass, ceramics and other tangible assets. Assets, in still another embodiment, may include any type of coin, gold coins, platinum coins, silver coins, gold dusts, silver dusts, platinum bars, gold bars, genuine gold, karat gold, rubies, emeralds, diamonds, simulated diamonds, genuine platinum, karat platinum, paintings, precious metal, precious alloys, precious metals, precious ores or concentrates, antique coins, and rare coins, for example. As a broad example, "art asset" as used herein further refers to any and all forms of tangible assets which have value, such as, but not limited to, the works by art masters, primary art work, secondary art work, fine arts, contemporary works and modern works; of any historical period, cultural and geographical style, design and type. Assets may also include educational materials, scientific materials, electronic books or libraries, music memorabilia, sheet music, records, movies, films, motion pictures, compact discs, digital video discs, musical instruments, entertainment devices or any type of intellectual property. An asset may also include tangible collectibles which have value, such as, but not limited to, ancient historical artifacts, memorabilia, weapons, toys, stamps and coins (both rare coins, bullion, precious metals, precious stones and other and all types of like commodities), paper money, possessory money, sports memorabilia, musical instruments, costumes, entertainment memorabilia, scientific and engineering memorabilia, maritime objects, wartime objects, transportation objects, arms and armatures, antiquities, governmental collections and archives, private historical properties, governmental real property and monuments, school and institutional assets, auction and consignment assets, private collections, library assets, and other valued public and private collectibles.

As those of skill in the art will now come to realize, an art asset may comprise a single asset (such as a sixteenth century gold coin), or may be combined (or, pooled) with other art assets (such as sixteenth, seventh and eighteenth century gold coins), whether or not similar in nature (such as, for example, sixteenth, seventh and eighteenth century gold coins combined with sixteenth, seventh and eighteenth century paintings). Thus, the present invention allows for inventive adaptability, so that depending upon user input, each art asset pool will have a unique art asset characteristic which may be desired by art asset investors.

SUMMARY OF THE INVENTION

The following summary of the invention is provided to facilitate an understanding of some of the innovative features unique to the present invention, and is not intended to be a full description of variations that may be apparent to those of skill in the art. A full appreciation of the various aspects of the invention can be gained from the entire specification, claims, drawings, and abstract taken as a whole.

The present invention is a system or method for obtaining, maintaining and controlling an exchange for tangible assets over a global computer network. In one embodiment, the present invention is a computer software program stored and operated on a computer system, the software adapted to identify one or more art asset which is categorized in to an art asset pool obtain an initial appraisal value for the art asset pool from third party appraisers or from an automated appraisal process, calculate an appraisal value for the art asset based upon the appraisal information it obtained, obtain orders from potential investors and/or brokers, process such orders, continuously monitor art asset value against appraisal information, and is further adapted to automatically switch ownership units amongst art asset pools based upon pre-defined triggering threshold events. The present invention creates a dynamic buy-sell environment for art assets over a network which utilizes the typically non-utilized art assets in a way that creates demand and appreciation, while concurrently having little or no change or impact on the control and use of the actual art asset.

In an exemplary embodiment of the invention, the present invention is a method, system, or process for obtaining, maintaining and controlling an exchange for tangible assets over a global computer network. The present invention is particularly suited for, but not limited to, tangible art assets or art asset pools.

The novel features of the present invention will become apparent to those of skill in the art upon examination of the following detailed description of the preferred embodiment or can be learned by practice of the present invention. It should be understood, however, that the detailed description of the preferred embodiment and the specific examples presented, while indicating certain embodiments of the present invention, are provided for illustration purposes only because various changes and modifications within the spirit and scope of the invention will become apparent to those of skill in the art from the detailed description, drawings and claims that follow.

The novel features of the present invention will become apparent to those of skill in the art upon examination of the following detailed description of the preferred embodiment or can be learned by practice of the present invention. It should be understood, however, that the detailed description of the preferred embodiment and the specific examples presented, while indicating certain embodiments of the present invention, are provided for illustration purposes only because various changes and modifications within the spirit and scope of the invention will become apparent to those of skill in the art from the detailed description, drawings and claims that follow.

BRIEF DESCRIPTION OF THE DRAWINGS

The present invention may be described herein in terms of functional block components and various processing steps. It should be appreciated that such functional blocks may optionally be realized by any number of hardware, firmware, and/or software components configured to perform any of the specified functions or steps. For example, the present invention's computer systems may employ various computing systems, including memory elements, digital signal processing elements, qualitative and quantitative data and other databases, or the like, which may carry out a variety of functions under the control of one or more computers or microprocessors or other control devices. Further, any software or hardware optionally employed may communicate through any known network such as the Internet or on an intranet. Such general techniques and components that are known to those skilled in the art are not described in detail herein. It should further be understood that the exemplary process or processes illustrated may include more or less steps or may be performed in the context of a larger processing scheme. Furthermore, the various flowcharts presented in the drawing figures are not to be construed as limiting the order in which the individual process steps may be performed.

FIG. 4 is another general graphical illustration of the overall algorithm to be created, maintained and controlled by the CCM system of the present invention as seen in FIG. 2;

FIG. 5 is a general graphical illustration of an exemplary appraisal algorithm to be created, maintained and controlled by the CCM system of the present invention;

FIG. 6a is a general graphical illustration of the overall algorithm representing the asset marketization step to be created, maintained and controlled by the CCM system of the present invention;

Additional aspects of the present invention will become evident upon reviewing the non-limiting embodiments described in the specification and the claims taken in conjunction with the accompanying figures, wherein like reference numerals denote like elements.

DETAILED DESCRIPTION OF THE PREFERRED EMBODIMENT

The present invention is directed towards the creation, management and coordination of secure ownership interests of art asset pools over a global computer network, wherein the art within each pool may be related (such as, for example, a pool containing only 16th Century paintings) or not (such as, for example, a pool containing a combination of select 16th Century paintings, 15th century gold coins and pre-World War II toys). Of course, those of skill in the art will recognize that any combination of art within each art asset pool is possible, and can be delineated within a representative computer software program as disclosed in the present invention.

Figure 2:
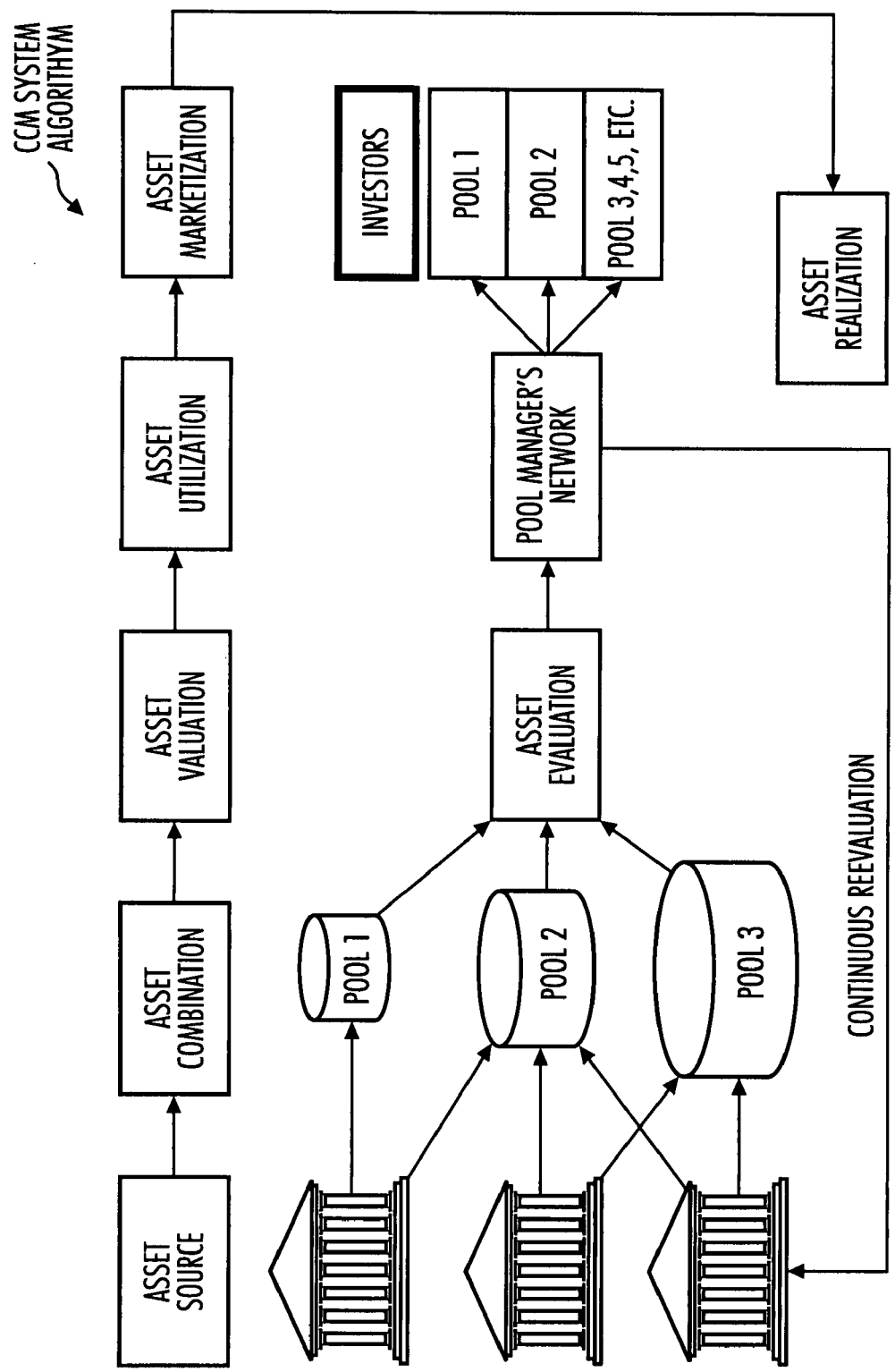
FIG. 2 is a general graphical illustration of the overall algorithm to be created, maintained and controlled by the CCM system of the present invention.
Figure 3:
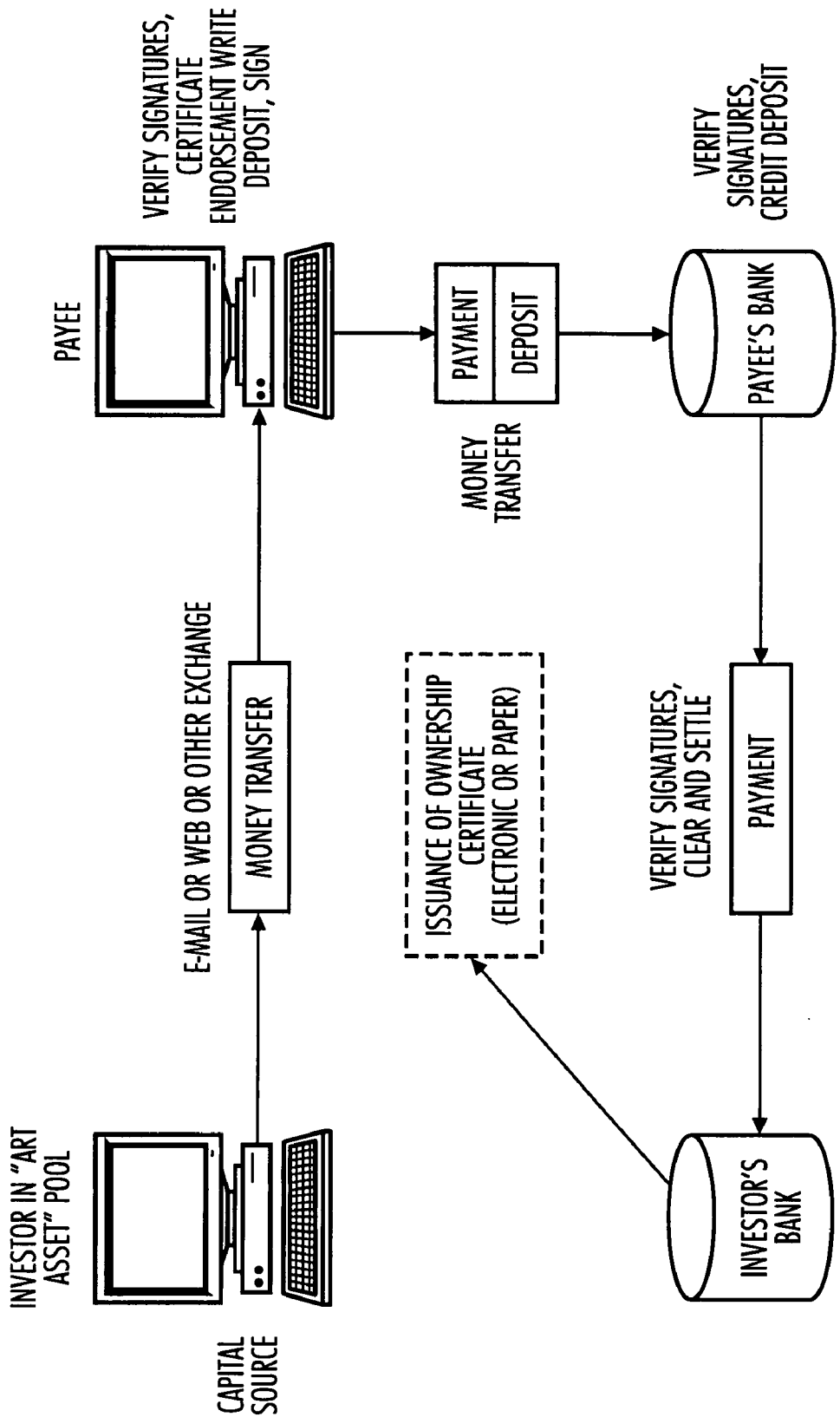
FIG. 3 is another general graphical illustration of the overall algorithm to be created, maintained and controlled by the CCM system of the present invention as seen in FIG. 2.
Figure 11:
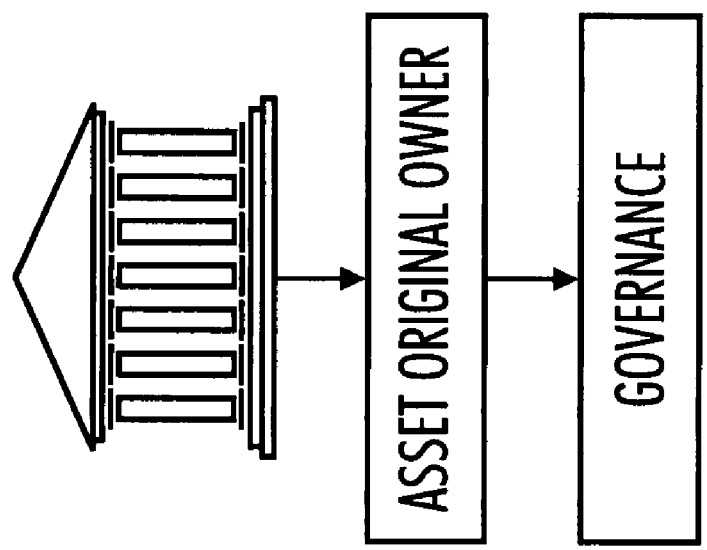
FIG. 11 is a generalized schematic representative of the governance which may be incorporated into or utilized by the CCM system of the present invention.

The overall process of the present invention is generally illustrated in the algorithm graphically illustrated in FIGS. 2, 3 and 4. In these Figures, the CCM system is introduced (not shown, but generally identified in FIG. 2) and programmed to initially identify an asset source. Such an asset source, in one embodiment, would be an art asset (e.g., painting) held or owned by art asset holder (such as, for example, a museum). Once this art asset and asset source is identified by the CCM system, the CCM system is programmed to create one or more art asset pools (labeled as "Pool 1", "Pool 2", etc. in FIG. 2), each pool information being stored in a database within the CCM system. At this point, the pool information could include, for example, the name of the art asset, the origin of the asset, the history of the asset, the location of the art asset, the physical description of the asset, the age of the asset, the environment and environmental characteristics in which the asset is being stored, the owner(s) of the art asset and any general information relating to the art asset (such as, for example, an explanation of why the art asset is valuable, a comparative description of similar art assets available and their values, a description of industry standards or expert evaluations, governance requirements over the art, the extent and scope of reproduction rights, or a description of the physical state and condition of the art asset). These various evaluation data points are graphically illustrated in FIG. 11.

Much of the pool information could be obtained electronically through an art scanning system (not shown). Such an art scanning system would be adapted to allow the art holder the ability to either electronically or manually scan information relating to the art into an art information computer system. The scan could also include a scan of the physical picture or representation of the art (such as, for example, scanning a rare coin on all sides and obtaining the coin's weight). The art information computer system would then be in electronic communication with the CCM system for the exchange of art information data (which could later be used to objectively obtain a grading value, and an appraisal value of the art asset). Moreover, such a scanning system may have the ability to create a digital image. With this digital image, the CCM system can then compare the art to a digital image of art rated at a lesser grade, and further compare the art to a digital image of art rated at a higher grade to thereafter place an objective value or classification on the art. In short, such an art scanning system would provide automated objective grading of art.

Of course, as identified above and graphically represented in FIG. 2, each pool will likely vary in scope, size, value and relatedness. The CCM software is also adapted to obtain and create asset evaluation information for storage within a database within the CCM system.

Next, the CCM system is adapted to dynamically obtain and store one or more appraisal values for the art asset. Initially, appraisal value and authentication is generated by the CCM system by allowing the CCM system to obtain grading information and appraisal values from art experts throughout the world. This may be accomplished by, for example, allowing the CCM system to automatically poll each grading expert's electronic database to obtain the most recent grading and appraisal values of art assets. For example, PCGS (Professional Coining Grade Service) of Newport Beach, Calif. (www.pcgs.com) can generate a grading and an initial appraisal value on almost any type of coin. The CCM system, in turn, may be adapted to poll the PCGS database to obtain and store values for art assets. The CCM system is also adapted to poll similar electronic databases and/or datasets throughout the world, or adapted to receive such data from remotely located computer systems, thereby resulting in obtaining values for the same art asset, but through different geographic locations throughout the world. Such information may come from various sources, such as, for example, an art auction house database. Each grading and appraisal dataset obtained by the CCM system will be stored in one or more databases, so that the CCM system is adapted to display not only the historical grading and appraisal values, but is also adapted to assist one or more Pool Managers with decisions, recommendations or solutions relating to buying certain art assets, selling certain art assets within an art asset pool, or doing nothing at all (e.g., maintaining status quo). Of course, only a single Pool Manager may be necessary to manage a particular art asset pool because that person may have expertise in the art placed in the art asset pool. However, this invention also contemplates and excogitates the use of one or more Pool Managers per art asset pool, as some art asset pools may include unrelated art.

In one embodiment as graphically illustrated in FIG. 5, the CCM system will define an appraisal value based upon the average of all collected appraisal datasets. As part of the appraisal information gathering, the present invention allows the CCM system to also collect any authenticity or verification data from the appraisers (such as, for example, verification letters, opinion letters, art asset description letters or certificates of authenticity, all of which may justify the appraisal value generated), and also obtain and store the physical location of the art asset (including location information, such as curator or art owner name, physical address, phone number and like information). The CCM system may also be adapted to obtain and store other appraisal-related data, such as the forecast of value of the art asset, historical appraisal data, comparative appraisal data, or even data relating to the sufficiency and/or deficiency of the appraisal being provided.

Those of skill in the art will now also come to recognize that while the CCM system may be adapted to collect an initial appraisal values from various sources, the CCM system may also be programmed to create its own initial appraisal values. This might be useful in those situations where, for example, appraisal values do not exist, or where, for example, obtaining such information is unduly burdensome. Of course, other situations might arise that necessitate the CCM system's generation or creation of an initial appraisal value which is independent of any other data source.

Notably, some art assets may be located physically in the same geographic area (e.g., a single painting), while other art assets might be located at various locations around the world (e.g., a collection of 15th Century weapons). Obviously, obtaining and maintaining track of the location of each art asset is an important objective of this present invention, and is an assurance to investors. All appraisal values should preferably be certified or justified in some manner as to prevent fictitious or made-up values, and to preserve the accuracy of the appraisal value. If necessary, the CCM system is adapted to print or re-print copies of any certificates necessary to justify the accuracy of the appraisal value from a third party appraiser. Moreover, though this process, the CCM system is adapted to constantly re-evaluate the appraisal datasets on an approximately real-time or concurrent time basis to generate an approximately real-time or concurrent time appraisal value based on appraisal values from throughout the world. Optionally, appraisal information may be obtained through an automated appraisal system or method which may be developed in the future. Such a system or method would preferably remove the subjective speculation that is commonly associated with the appraisal process. With any of this information, the Pool Manager can make decisions which are critical to the value of any one art asset pool.

The CCM system of the present invention may be electronic, computer, software or hardware based, network based, or any combination thereof. The CCM system is adapted to coordinate the governance of each art asset pool as it relates to the art asset's location, ownership and ownership percentages, pricing, trading, replication, liquidity, secondary market, pool size and any other investment, management and ownership requirements, issues or features available, as the pool construction dictates. In addition, the CCM may communicate with remotely located computers throughout the world via the Internet, or any other communications means, such as a telephone, cellular phone, microwave communications, radio frequency, satellite communications, wireless personal digital assistants (PDAs), facsimile transmission or any similar communication means. Those of skill in the art will now realize that any number of communication protocols may be employed to realize the present invention, including voice transmission, by voice synthesizer transmission, by audio transmission, by audio-visual transmission, by radio frequency transmission, by electronic signal transmission, by a touch screen; including by any type of wireless protocol comprising cellular, microwave, IEEE 802.11x, Bluetooth, satellite; and including by wirelan protocol comprising a telephone, a handheld devices, an onsite or offsite communication device, a wireless device, a point device, a touch device, a personal computer or any combination thereof.

The CCM system may be connected to other computer systems locally or remotely over a network. The network may be a public network and assumed to be insecure and open to eavesdroppers. In the illustrated implementation, the network may be embodied as the Internet. In this context, the computers may or may not be connected to the Internet at all times. Specific information related to the protocols, standards, and application software utilized in connection with the Internet may not be discussed herein.

Figure 1:
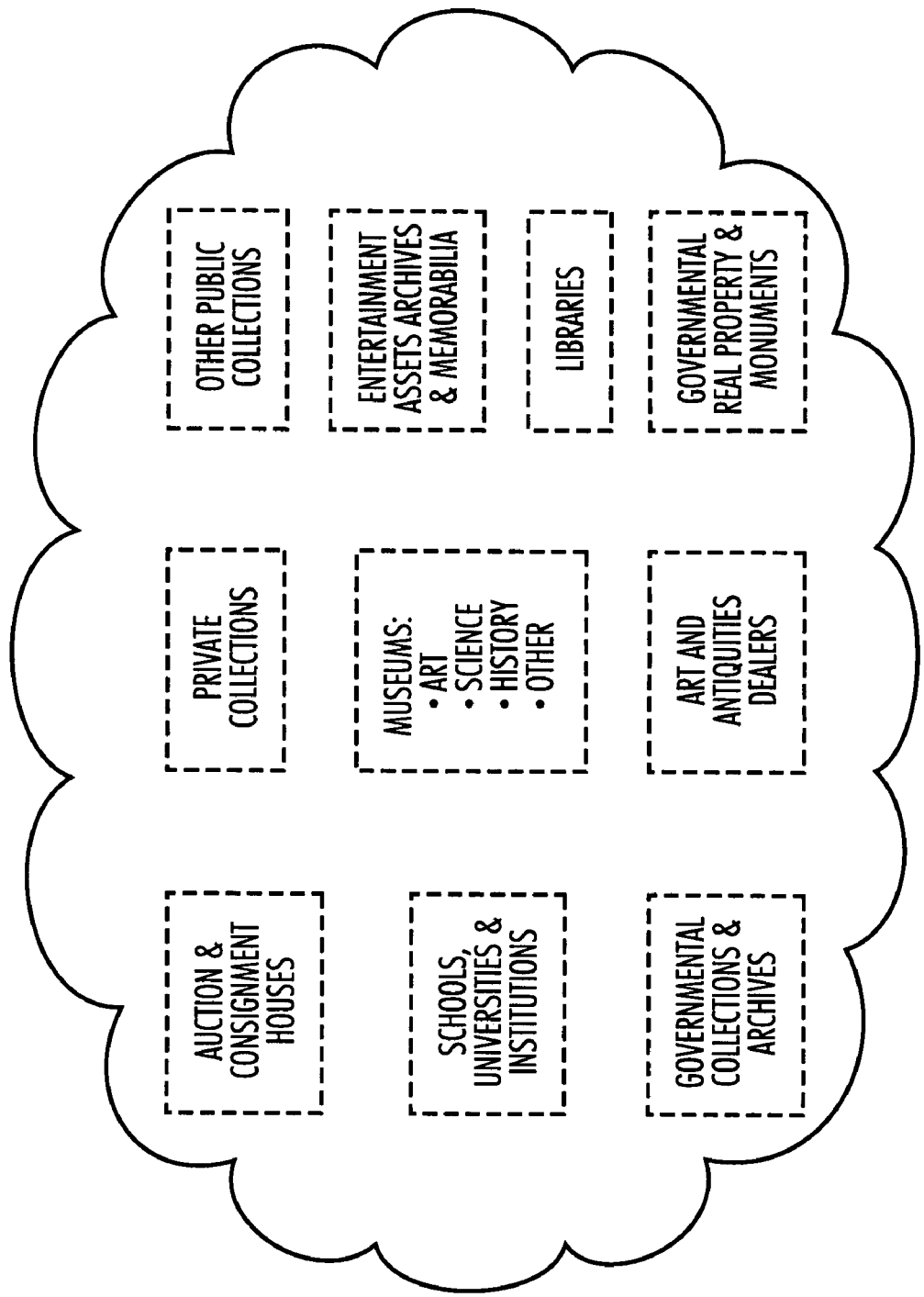
FIG. 1 is a graphical illustration of the various types of ownership entities which may claim an ownership unit in any art asset pool created by the present invention.

As described throughout this invention, the actual source of ownership of any art asset may held by any number of entities, such as, for example (as seen in FIG. 1), auction houses, educational institutions, governmental entities, museums, public entities or private entities. Thus, for example, each art asset pool may be classified by a number of various classification, such as a single source pool (defined as a single organization or entity in which the assets are titled or controlled), a multiple source pool (defined as multiple organizations or entities in which the assets are titled or controlled), a variable risk pool (defined as the situation where one investor pool, organization or other investor source buys some or all of the assets from an existing investor pool, thereby changing the mix in both pools or even eliminating an existing pool completely by having all of its assets being purchased), multiple risk pools (defined as pools which are created with pre-defined risk assessments ranging from low to high which are associated with pre-defined threshold triggers), single classification pools (such as, for example, a single source of the same or related art within the pool, such as 19th Century Romantic artwork) a diversified classification pool (defined generally as, for example, a collection of pre-defined forms of art styles), a time-based investment pool (defined generally as a pool having art assets with various maturities from short term to long term, which could be continued as a pool or terminated upon a pre-defined maturity event), or a hybrid pool (defined generally, for example, as a combination of any of the foregoing pools). Each of these classifications is created by the CCM system and stored on the computer. Each asset pool created by the CCM system will preferably also have a corresponding investment policy stored by the CCM system. Representative investment policies will identify and provide various levels of risk associated with the pool (varying from none to high).

One of the main advantages with this initial appraisal approach is that the CCM system is adapted not only to electronically communicate with and obtain publicly available datasets, but the CCM is also adapted to communicate with and obtain private (or, otherwise secure) datasets. In many situations, a private art holder may desire to place a certain privately-owned art asset up for sale, or may desire to sell an ownership interest in the privately-owned art asset (in many cases, privately-owned art assets are even more rare than publicly-available art assets, and as such, will likely command a much higher initial appraisal value). However, there are reasons why the art hold may not wish to publicly announce either a sale or division of ownership interest. For example, the art holder may not want any publicity surrounding the sale. Alternatively, the art holder may wish to "test the waters" to determine whether there is any public interest in the sale or ownership interest of the art asset. In this fashion, the CCM system's ability to communicate with both private and public art holders to obtain appraisal values and generate an approximately real-time or concurrent time appraisal value is a step forward in technology.

Moreover, it is advantageous in one embodiment to secure the CCM system with a login or subscription process, so that only approved users of the system may access the CCM system information. In one exemplary embodiment, the CCM system is adapted to provide a login or subscription process, and upon financial verification and payment, allow a user to access the CCM system data.

Next, as further seen in FIGS. 2, 3, 4, 6a and 6b, the CCM system is adapted to provide asset evaluation information to a Pool Manager to assist the Pool Manager's decision as to which art asset pool to offer through the CCM system. The CCM system's asset evaluation information is based upon a number of variables, including the asset source, the types of assets combined in a pool, the asset's appraisal value, and the verification of the asset, for example. Those of skill in the art will realize that other variable may be considered and programmed in to the CCM system as well. Armed with the asset evaluation information, the Pool Manager may then proceed to offer the art asset pool through the CCM system, or, as labeled in FIG. 2, begin the "asset utilization" process.

Figure 6B:
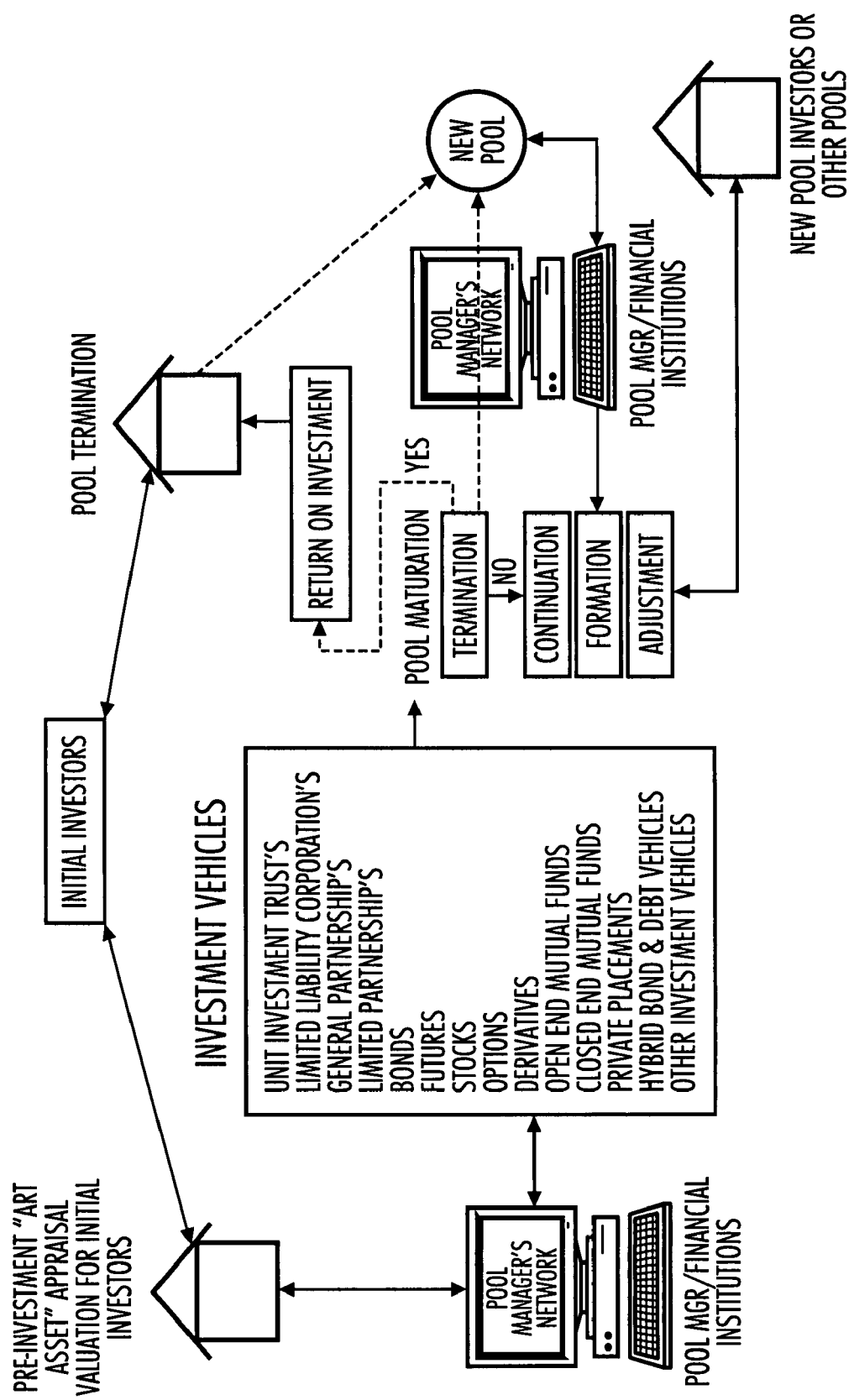
FIG. 6b is another general graphical illustration of the overall algorithm representing the asset marketization step to be created, maintained and controlled by the CCM system of the present invention.

Next, as graphically illustrated in FIGS. 6a and 6b, the CCM system is adapted to receive instructions from the Pool Manager to offer the art asset pool through a public offering (the "asset marketization" step). This step may be accomplished in a number of exemplary ways. For example, a publicly-available initial price offering ("IPO") communication may be created by the CCM to art investors throughout the world notifying them that a particular art asset or art asset pool will soon be available through a public offering. Or, the IPO communication may be sent to a pre-defined number of pre-approved brokers. The public offering communication may be made through a mass electronic mail, for example, or may be posted on a publicly-available Internet web site. Of course, as is standard in any exchange process, an appropriate prospectus may be made available (either on-line or in paper format) to the prospective investor for review prior to purchase.

In one embodiment, the CCM system is adapted to create a certain number of ownership units corresponding to each art asset pool. While the term "units" is used herein to denote an ownership interest, those of skill in the art will recognize that other equivalent terms exist, so that the term "units" is not definitionally limited in scope, and could include, for example, the term "shares" and/or units. Subsequently, the CCM system may then create an initial price per unit or share of ownership for the art asset (or pool) for publication in the IPO communication. Because the CCM system initially establishes a set number of ownership units corresponding to the art asset pool, each art asset pool may be limited to a pre-defined number of ownership interest units as defined by the CCM system. This means that the CCM system, with input from the Pool Manager, may be adapted to create a limited number of investors for any particular art asset pool. For some art asset pools, the number of investors may be high due to the high value of the art asset pool. In other situations, the CCM system may be programmed to limit the number of ownership units to account for the rarity of the corresponding art asset. In still other situations, while the CCM system may set up a plurality of ownership units or shares for a particular art asset pool, it may be possible for a single person or entity to purchase (and therefore own) the entire art asset pool. In any event, the CCM system is adapted to set the price per unit (or, shares) being offered through the IPO communication, either directly based on appraisal values previously obtained, or in combination with input from the Pool Manager. This means that once all ownership units are purchased, no other unit ownership units will be available to any potential investor. In this situation, if a potential investor desires to purchase into an art asset pool that is already completely owned, the potential investor must wait until the CCM system accepts instructions from an art asset owner of his desire to leave (or, liquidate from) the art asset pool. Upon such instruction, the CCM system is adapted to send out another IPO communication notifying potential investors that some units are available for the particular art asset pool. Moreover, the CCM system may be adapted to receive purchase offers from potential investors. Thereafter, the CCM system may be programmed to transmit such offers to the owners of the art asset pool to determine whether an existing owner desires to sell all or some of his ownership interest in the art asset pool. Obviously, like any exchange system, the CCM system may also be programmed to modify the price per unit value over time as the demand for the art asset pool changes, or, may also be programmed to change units of ownership as may be deemed necessary by the Pool Manager. Moreover, like any exchange system, the CCM system may also be programmed to allow the Pool Manager to modify the mix of art within any particular art asset pool as may be deemed necessary by the Pool Manager.

In one preferred embodiment, the CCM system is programmed to pre-define a limited time period for ownership for each art asset pool created, so that (for example) ownership interests are locked for a set amount of time. Thus, for example, and similar to a certificate of deposit, the CCM system may be programmed to penalize an ownership unit owner if the owner decides to withdraw (or, liquidate) any portion of their ownership interests prior to the pre-defined time period for ownership set by the CCM system.

Next, as shown in FIGS. 2, 3, 4, 6a and 6b, the CCM system is adapted to receive or otherwise transact sale orders and corresponding order income and payments from investors immediately (and more typically, after the first IPO communication is transmitted by the CCM system to potential investors). As mentioned throughout this invention, such orders transactions, incomes and payments are preferably made over a global computer network (such as the Internet). Naturally, because of the nature of the exchange, such order and payment information is naturally executed by the CCM system through a secure login and ordering process available in the art.

The CCM system communicates with other computers through a global network such as the Internet. In this regard, the CCM system is adapted to allow public or private investors to access their account information pertaining to each art asset pool, photos of each asset in the pool, generate performances of the pool, obtain secondary market information, obtain pool directories, and obtain prospectuses and other public information regarding each art asset pool. Moreover, the CCM system is adapted to provide investors with a risk assessment report for risk tolerance which will help investment managers with the evaluation of all influences of risk, that until the present invention, did not exist in the market. Other CCM system processes may include the ability to track investment term expiration, generate liquidation reports for any art asset pool, and provide information relating to tax benefits, incentives or obligations. The CCM system is also preferably adapted to post EFT credit and all of the processes and governmental data filing requirements for the SEC. The sophisticated network and discretionary filtering process embedded within the CCM system will collectively be used for third parties and governmental officials that regulate public investment offerings. Moreover, The CCM system is adapted to keeps track of individual art assets within every pool, the accuracy of which is critical for investors and insurance policies corresponding to the art asset.

In one preferred embodiment, the CCM system is adapted to continuously maintain track of art asset pool values which become market driven rather than appraisal value driven. If an art asset pool is market driven, this means that the art asset pool is being valued by investors at a rate which differs from the appraisal rates being generated at any certain time. A graphic representing this continuous loop evaluation process is illustrated in FIGS. 2, 4, 6a and 6b. For simplicity, the following example shows how an appraisal-valued asset can, in time, become market driven so that the overall value of the asset is higher (and sometimes, much higher) than appraisal data. Thus, for example, say a residential house in Honolulu, Hi. is placed on the real estate market for sale at $800,000. The value of $800,000 was set by the realtor with consultation with the homeowners, and is based on the values of existing home sales in the general Honolulu area market. But, due to the scarcity of nice homes in the Honolulu market, real estate investors routinely offer over the asking price in order to ensure the purchase of the residence. Thus, for example, a real estate investor may offer a premium to the homeowners of $900,000 for the home, in order to (hopefully) outbid all other bidders and to ensure obtaining an ownership interest in the Honolulu home. In this example, while the initial appraisal is appraisal driven, over time or due to other circumstances, the value of the home asset becomes market driven and as a consequence, becomes more valuable than the appraisal value. The time to achieve a market driven value may be very short (on the order of seconds) or may be long (days, weeks, or perhaps years). As contemplated by this invention, the CCM system is preferably adapted to maintain track of the value of each art asset pool, and identify (upon a pre-programmed triggering threshold event) any trend when a certain art asset pool is becoming valued at a market driven approach (and therefore, is becoming more valuable to art investors).

Figure 12:
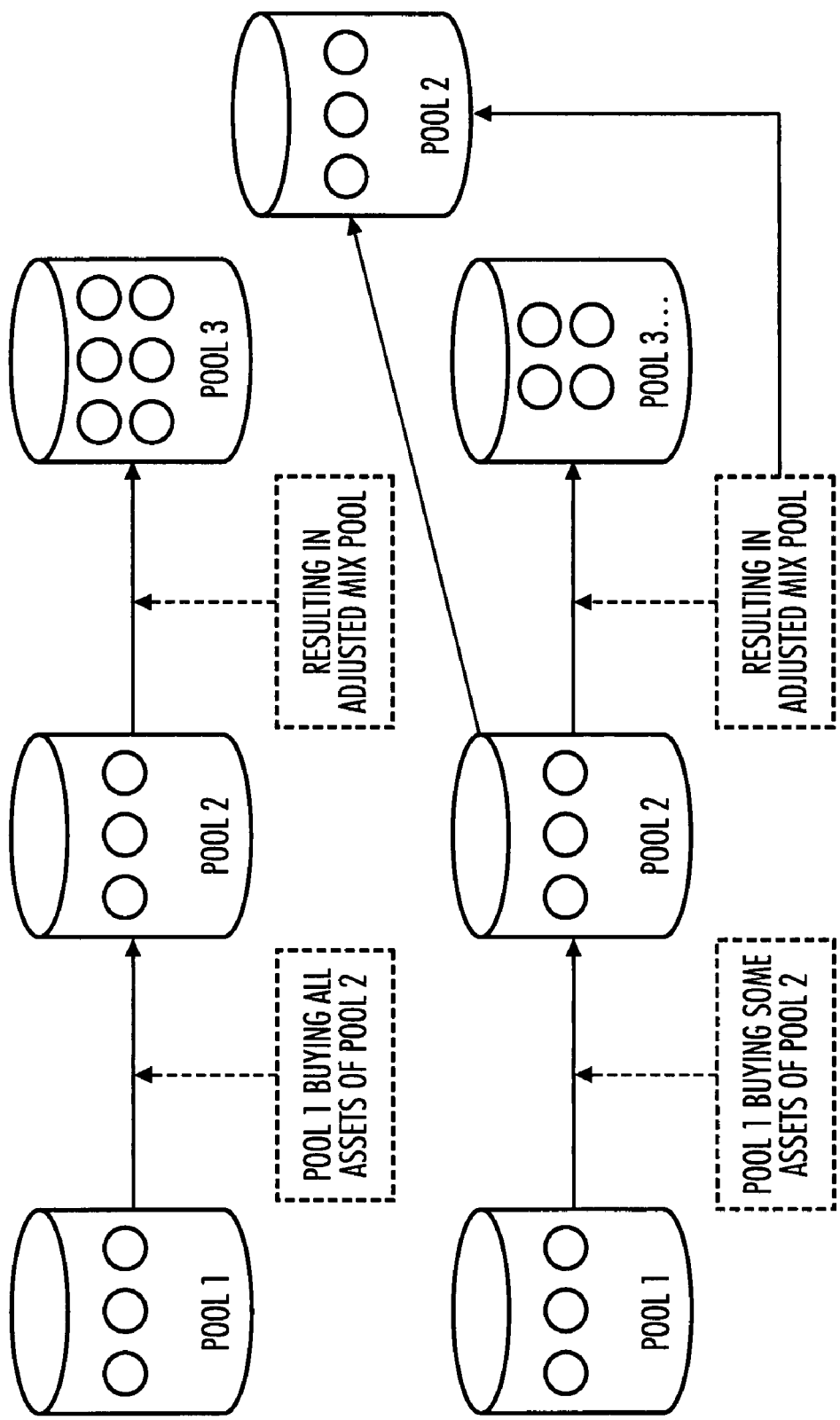
FIG. 12 is a general schematic exemplifying the various types of art assets that may be created and/or combined through the CCM system of the present invention.

As such, the CCM is optionally programmed to continuously compare historical appraisal information for a particular art asset pool with current market driven values obtained in approximately or concurrently real time to thereby generate dynamic market information which can be electronically transmitted to investors and/or the Pool Manager. In this regard, the dynamic market information will reflect whether the art asset pool's value (since inception) has increased, remained flat or decreased, thereby allowing the CCM system, the potential art investor or Pool Manager to maintain ownership in the art asset pool, liquidate from the art asset pool, or obtain more ownership interest in the art asset pool (if additional ownership units are available), or obtain (as shown graphically in FIG. 12) a mixture of any pool.

Moreover, in one embodiment, the CCM system may be adapted to receive input from the Pool Manager to discretionarily transfer or switch ownership units in one art asset pool to another art asset pool. For example, a Pool Manager may have ownership units in an art asset pool covering sixteenth century paintings. In time, this particular art asset pool may become less popular, so that the trend value of each ownership unit corresponding to this art asset pool decreases. Upon some pre-defined triggering threshold event, either the CCM system or the Pool Manager may decide to transfer or switch ownership units corresponding to the sixteenth century art with an art asset covering nineteenth century coins (or, some other art asset or art asset pool). In sum, the CCM system is adapted, upon a pre-defined triggering threshold event (such as an increasing value historical trend, or a decreasing value historical trend), to switch ownership units from one art asset pool to another (different) art asset pool. Again, this process is graphically illustrated in FIG. 12.

Figure 7:
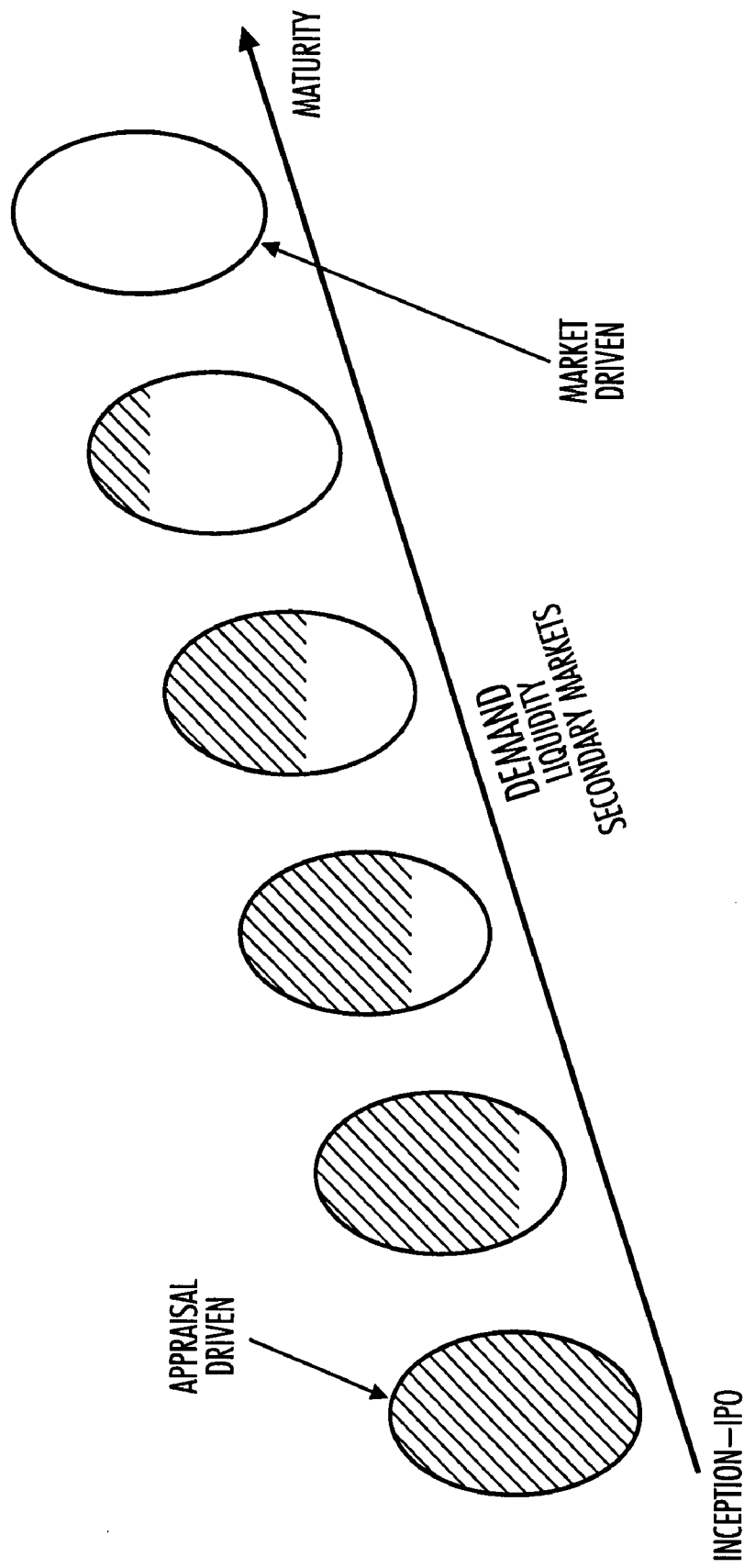
FIG. 7 is a graphical illustration exemplifying an art asset pool created and maintained by the CCM system of the present invention which is initially driven by appraisal value (the skewed lines representing the value of the asset as measured by appraisal data) that, over time, may become an art asset pool driven by market demand.
Figure 8:
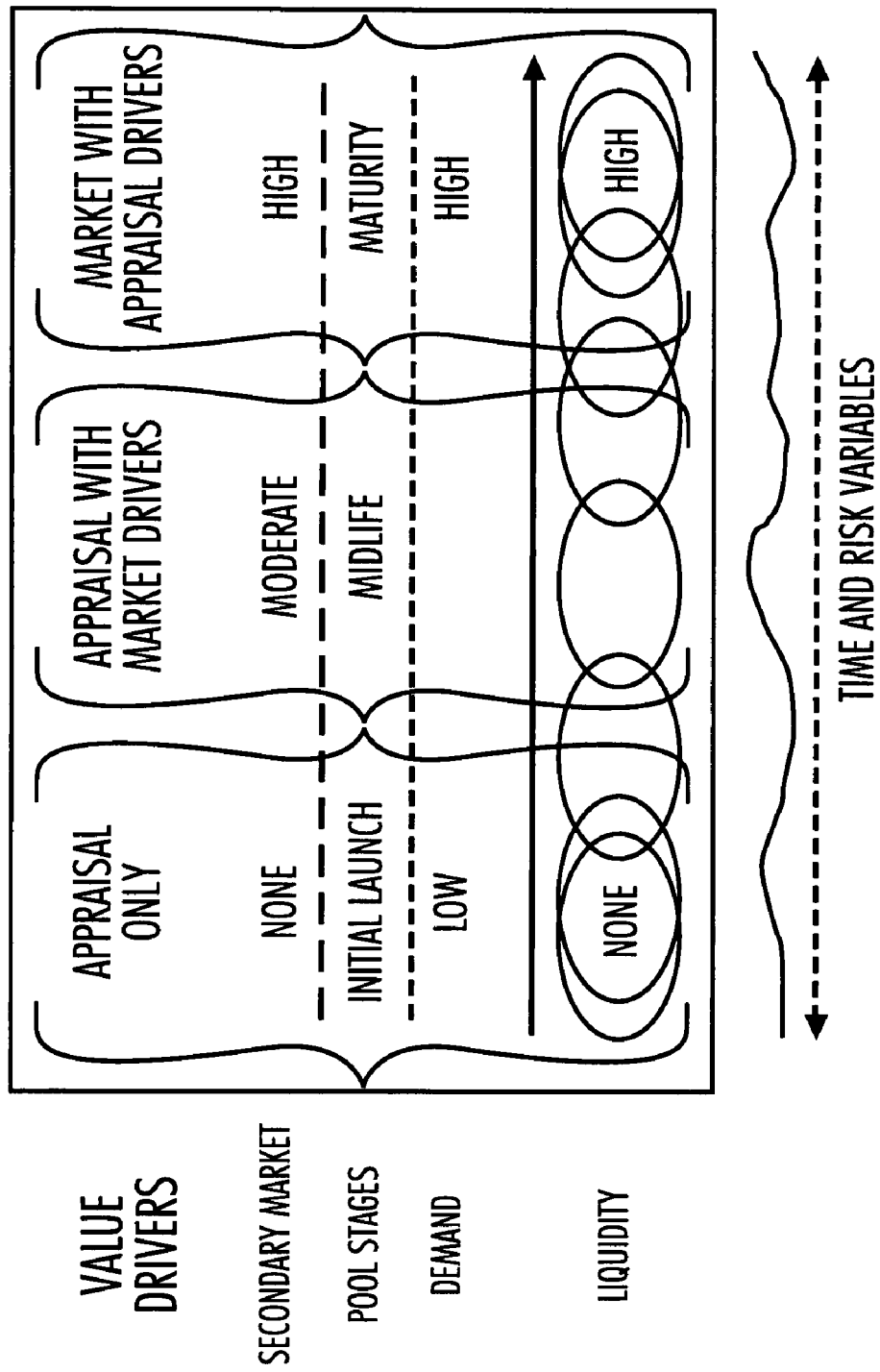
FIG. 8 is a graph that exemplifies FIG. 7, the graph illustrating an art asset pool created and maintained by the CCM system of the present invention which is initially driven by appraisal value that, over time, may become an art asset pool driven by market demand.
Figure 9:
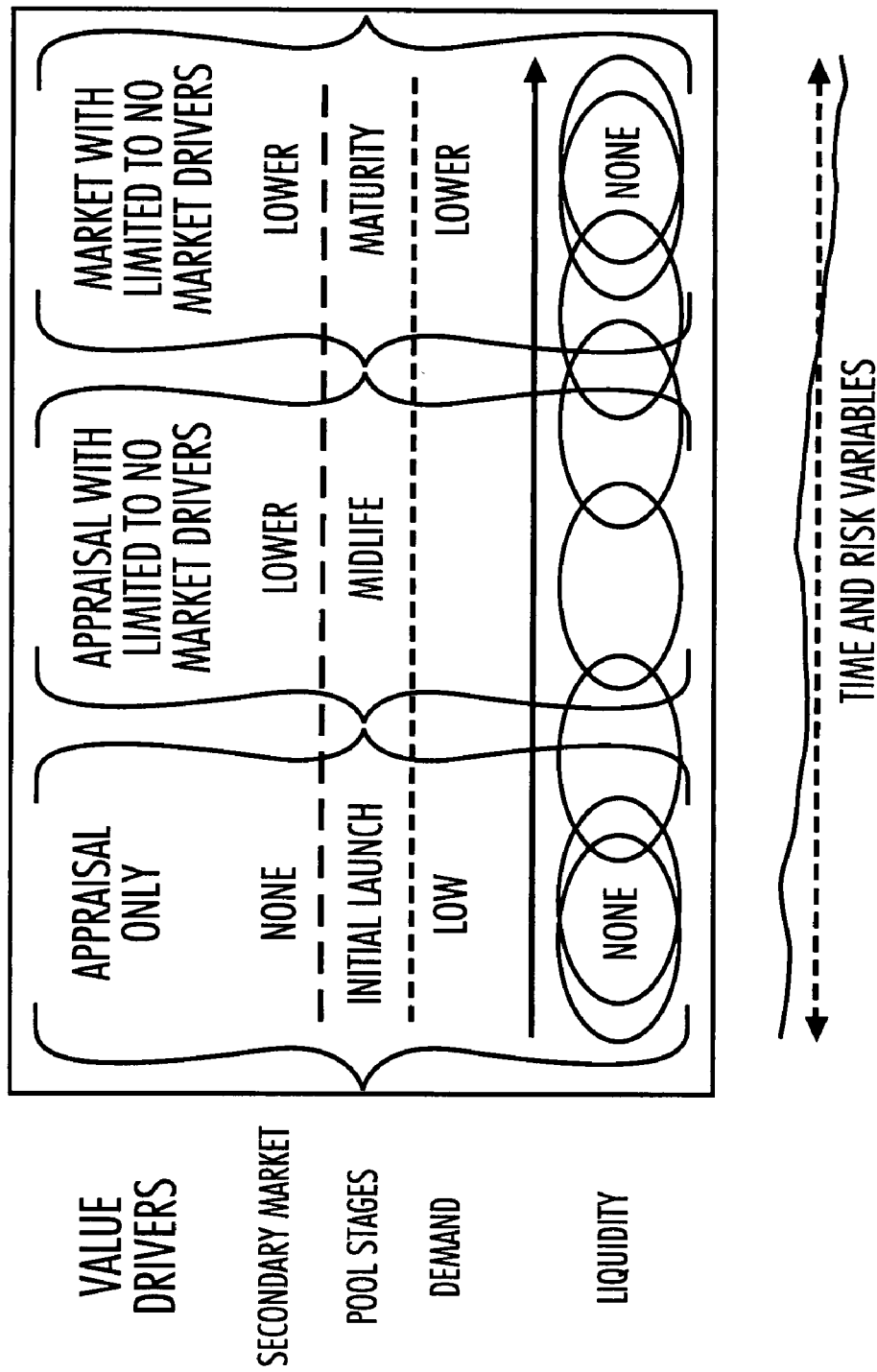
FIG. 9 is a graph illustrating an art asset pool created and maintained by the CCM system of the present invention which is initially driven by appraisal value that, over time, may depreciate in value due to a decreasing market demand.
Figure 10:
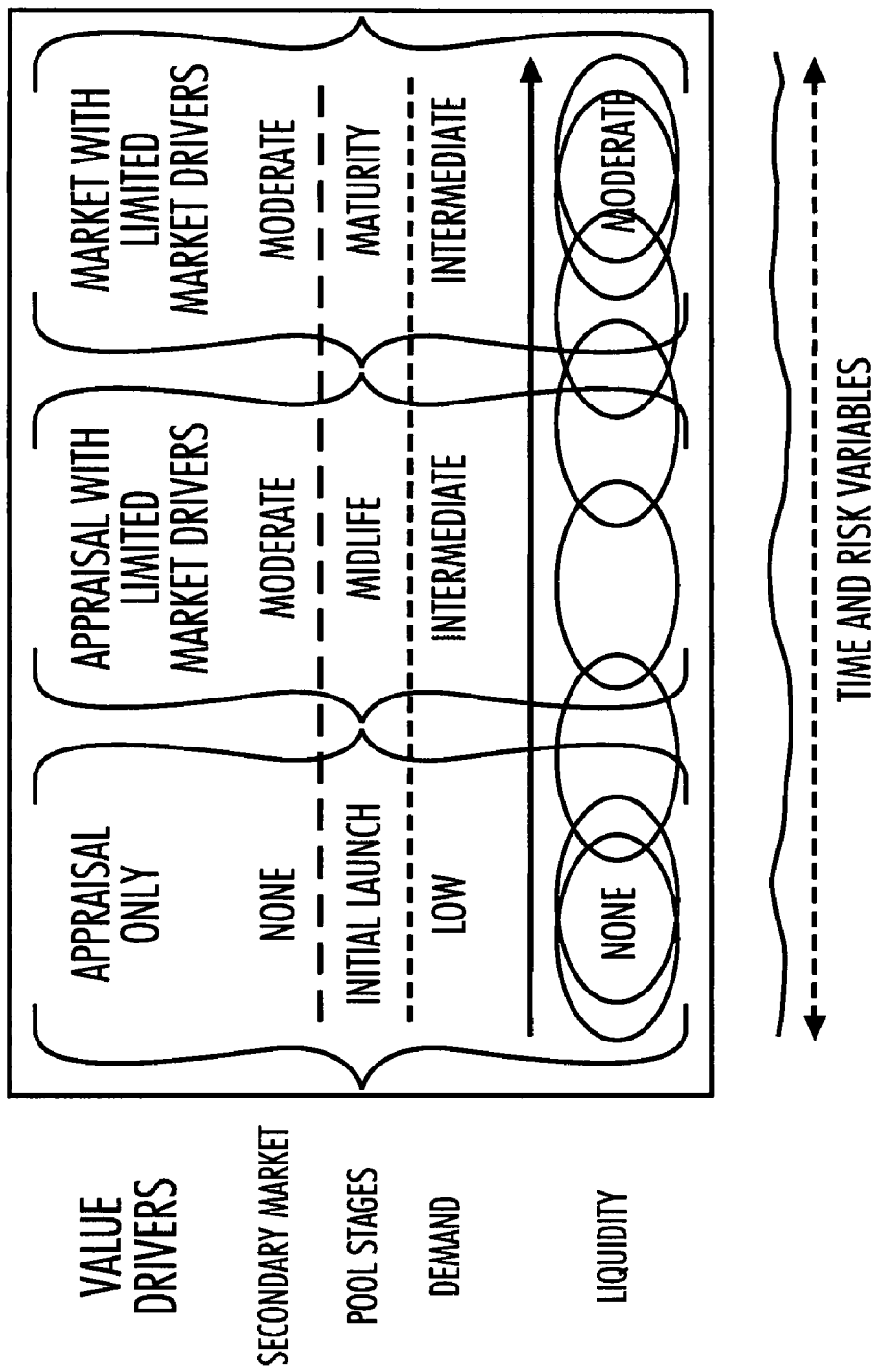
FIG. 10 is a is a graph illustrating an art asset pool created and maintained by the CCM system of the present invention which is initially driven by appraisal value whose value, over time, does not significantly fluctuate.

Thus, for example, FIG. 7 illustrates an art asset pool that, at inception or initial price offering, is valued entirely by a known appraisal value obtained from appraisal databases (the skewed lines representing the value of the asset as measured by appraisal data). As time progress (reviewing the chart from left to right), the value of the art asset pool is preferably driven more by market driven demands (represented by the colorless region within each pool), so that upon a pre-defined maturity point, the value of the art asset pool is entirely, if not approximately entirely, determined by a market driven value (and, as a consequence, at a value that is higher than an appraisal value). It is the middle portion of this chart which represents many variables that will dictate whether a particular art asset pool will move over to a market driven value. In a preferred embodiment, an art asset pool will obtain popularity amongst secondary market investors who desire to buy ownership units in the art asset pool, thereby creating more market driven values (and, creating the ability to sell ownership units faster). This trend is also illustrated in FIG. 8, wherein initially, the art asset pool's liquidity is low at inception, and steadily increase over time to maturity. In this situation, the CCM system will monitor this art asset and classify it as "hot" or as an increasing art asset pool. However, the opposite could occur, as illustrated in FIG. 9. This could occur, for example, when the art asset pool never achieves any type of popularity amongst art investors, and therefore, the art asset pool never achieves liquidity through the market driven approach. In this situation, the CCM system will monitor this art asset and classify it as "cold" or as a decreasing art asset pool, and immediately move ownership units to a more moderate or increasing art asset pool. Consequently, a moderate liquidity could occur as graphically illustrated in FIG. 10, which means that the value of the art asset (and hence, liquidity) does not increase significantly over time. In this situation, the CCM system could monitor this art asset and classify it as "neutral" or as a moderate art asset pool. Here, the CCM system may be programmed to identify the moderate characteristics early in the pool's life, and when identified, move ownership units to a more moderate or increasing art asset pool upon a triggering threshold event.

As mentioned above, the triggering threshold event which triggers a switch of ownership units from one art asset pool to another art asset pool may be pre-defined. One of the most popular indicators of risk is a statistical measure called "Beta." Conventionally, stock analysts use this measure to get a sense of a stocks' risk profile. The term "Beta" is a well-known term which defines a measure of a stock's volatility in relation to the market, and is conventionally used to provide quantitative and qualitative risk analysis. By definition, the market has a Beta of 1.0, and individual stocks are ranked according to how much they deviate from the market. A stock that swings more than the market over time has a beta above 1.0. If a stock moves less than the market, the stock's beta is less than 1.0. High-Beta stocks are typically riskier but provide a potential for higher returns; low-Beta stocks pose less risk but also lower returns.

The present invention excogitates the CCM system's use of Beta as a optional mechanism (not shown) for establishing a triggering threshold event. Thus, for example, the CCM system may be programmed to set the Beta of a particular art asset pool at the average appraisal price of the pool upon IPO communication. If the Beta exceeds 1, the CCM system may be programmed to generate a single triggering threshold event, and thereafter, periodically notify potential investors and the Pool Manager (so as to allow these entities to either continue monitoring the art asset pool, make a decision to liquidate, or, make a decision to switch ownership interest to another art asset pool). Since a single triggering threshold event is equivalent to a small increase, the CCM system is adapted to merely notify potential investors and the Pool Manager, and not take any action itself. Alternatively, if the Beta exceeds 1, the CCM system may be programmed to examine all art asset pools and automatically switch (or transfer) ownership units from an art asset pool having a Beta less than 1 (and thus, underperforming) to the art asset pools which have a Beta greater than 1. Likewise, if the Beta associated with a particular art asset pool greatly exceeds 1, the CCM system may be programmed to generate a single triggering threshold event, and thereafter, automatically switch (or transfer) ownership units from the art asset pool having a Beta significantly greater than 1 (because the pool might have reached its high value or is nearing its high value) to an art asset pool with a smaller Beta value. Conversely, the CCM system may be programmed to generate a single triggering threshold event if the Beta is reduced to below 1, and thereafter, the CCM system may be programmed to examine all art asset pools and automatically switch (or transfer) ownership units from the art asset pool having a Beta less than 1 (and thus, underperforming) to the art asset pool which has a Beta greater than 1. Likewise, if the Beta associated with a particular art asset pool is significantly less than 1, the CCM system may be programmed to generate a single triggering threshold event, and thereafter, automatically switch (or transfer) ownership units from the underperforming art asset pool to an art asset pool with a greater Beta value. In any event, the CCM system is adapted to store and utilize historical art information data to delineate and classify the risk levels associated with each art asset pool based upon the pool's past volatility.

Another optional way for the CCM system to generate a triggering threshold event is by use of a dynamic standard deviation system. In this fashion, the greater the magnitude of deviation and the greater the probability of its occurrence, the greater is said to be the risk of the security. The variance of distribution for any particular art asset pool could be measured, for example, by the use of any well-known standard deviation formula. As demand for a particular art asset pool increases, a shift of probability of returns occurs as the secondary market volume rises in time (e.g., the asset's value becomes market driven). Probability of occurrence and return must factor the market influences when calculating investment return. Those of skill in the art will recognize that other processes and/or formulas may be used to estimate probability distribution of possible returns during any period of time.

As the secondary market develops, the art asset pool is intended, preferably, to morph into a dynamic market driven investment. Even though a pure market driven exchange is possible if demand is high enough, dynamic appraisal valuation input will continuously be used by the CCM system even after the initial price offering.

Figure 13:
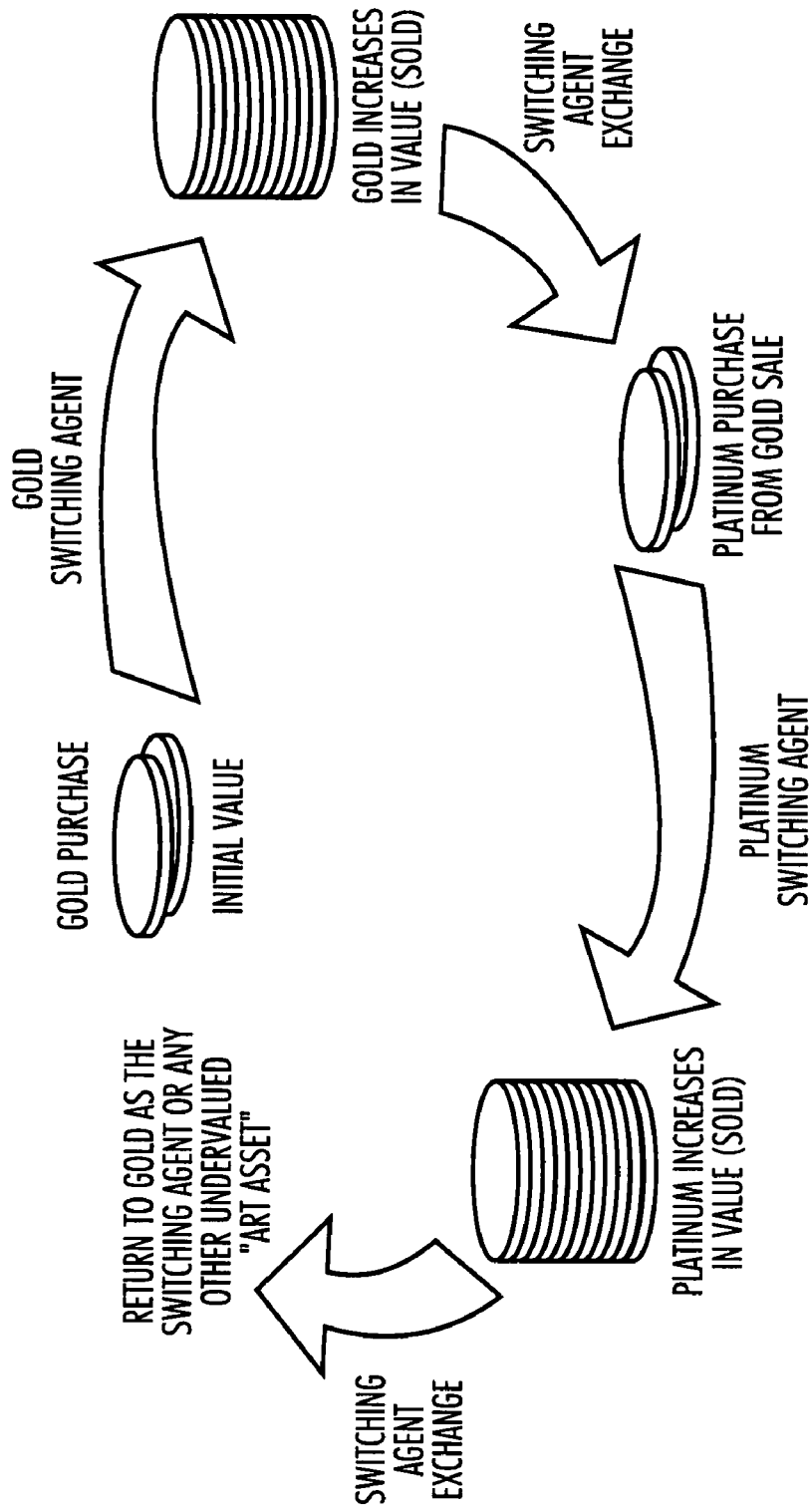
FIG. 13 is a schematic which exemplifies the switching process that may be implemented by the CCM system of the present invention.

As stated above, the CCM system is adapted to notify investors or Pool Managers of any triggering threshold events (whether increasing or decreasing), to allow the investor or Pool Manager to use the CCM for switching assets, as desired, as illustrated in FIG. 13. In other words, the CCM system is adapted to notify inventors and Pool Managers of triggering threshold events, and further adapted to accept instructions to automatically adjust the ownership interests between separate art asset pools as pre-directed by an investor.

In still another embodiment, the CCM system is adapted to dynamically track orders from investors, is adapted to dynamically maintain and track investor portfolios, and is adapted to automatically adjust the ownership interests between separate art asset pools as pre-directed by an investor.

Those of skill in the art will realize that the CCM system of the present invention (and any element which communicates with such system) may be described herein in terms of functional block components, and various processing steps. It should be appreciated that such functional blocks may also be realized by any number of hardware and/or software components configured to perform the specified functions or steps. For example, the present invention may employ various computing systems, including memory elements, processing elements, logic elements, quantitative and qualitative data (which includes, but is not limited to, historical data) and the like, which may carry out a variety of functions under the control of one or more microprocessors or other control devices. Similarly, the software elements of the present invention may be implemented with any programming or scripting language such as C, C++, Java, XML, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like.

Additionally, there may be circumstances which require the special processing of orders or payments relating to the art asset pool due to legal restrictions or other similar restrictions. In these situations, the CCM system may thus be adapted to process or otherwise authenticate identification of the art investor, verify the investor's ability to purchase or transact business with the CCM system, and if authentication and identification is confirmed, process and confirm the investor's order (including allowing the CCM system to generate and transmit a certification of art asset pool ownership to the investor). If this verification process is unsuccessful, the order will not be processed and the investor's order will not be processed nor confirmed. One representative verification system may include a biometric verification system. By using a biometric identification system, for example, the unique properties of each art asset owner can be initially stored on the CCM system and be retained on file for subsequent confirmation. Such biometric verification methodologies include, but are not limited to, fingerprints, eye patterns, visual (face) identification, license scanning, voice, vehicle identification, non-invasive cell scans and others. Such verification can also be used to determine whether the art asset owner has previously transacted business with the CCM system, or if the customer is a validated member due to a prior transaction with the CCM system. Of course, such verifications should fully comply with applicable local, state and federal regulations. Those of skill in the art will recognize that a representative verification system can communicate with the CCM system through wired or wireless communication means. The CCM system may implement data error verification means to provide greater assurance of order accuracy and allows an overall integration to provide total business review and management capabilities.

The disclosed CCM computer system, in still another embodiment as seen in FIG. 3, may be configured to manage such clerical operations as verification of orders, verification of signatures, verification of endorsements, order confirmation, payment confirmation, deposit of order funds confirmation with the investor's banking source, clearing and settlement of payment funds with the investor's banking source, printing of receipts, printing of ownership certificates, printing of reports relating to any of the art asset pools and the printing of any other report desired by the Pool Manager, whether by electronic means or by paper means.

Thus, FIGS. 2, 3, 4, 6a and 6b provide an overall view of the many capabilities of the CCM system. As disclosed throughout this invention, the CCM system is a computer program residing on a computer with memory. The CCM system is adapted to identify one or more art asset which is categorized in to an art asset pool. The CCM system then obtains an initial appraisal value for the art asset pool from third party appraisers or from an automated appraisal process. The CCM system then verifies and cross-checks the appraisal information, and calculates an appraisal value for the art asset based upon the appraisal information it obtained. Next, the CCM system is adapted transmit an IPO communication to obtain orders from potential investors and/or brokers, track and certify such orders, and process such orders. Next, the CCM system is adapted to continuously monitor art asset value against appraisal information, and is further adapted to automatically switch ownership units amongst art asset pools based upon pre-defined triggering threshold events (as seen in FIG. 13).

As used herein, the term "network" refers to any electronic interconnection between two or more electronic devices over which data is transferred, including, but not limited to, the Internet, an intranet, a land line or traditional telephone network, a cellular or wireless mobile network, a wireless microwave network, television or radio wave transmissions, a cable network, a wireless connection (for example, infrared or microwave connections), satellite, a localized land network system, induction connection using electric lines, a wireless network using lasers as the transmitting medium, any combination of any of the preceding or any other system for the transmission of data between two or more units. An encrypted or "secure network" is a network employing security measures against unauthorized access to data being transmitted via the encrypted network or data stored within a memory storage area of a device connected to the secure network. And, the term "facility" may refer to a multi-story building; a single level building and a site built custom designed building that is location specific as to marketing needs and site ramifications.

The present invention may be embodied as a system, process or method. Other variations and modifications of the present invention will be apparent to those of ordinary skill in the art, and is not limited except by the appended claims. The particular designs and configurations discussed herein can be varied, and are cited to illustrate particular embodiments of the present invention. It is contemplated that the use of the present invention can involve components having different characteristics as long as the principles disclosed herein are followed.

The size of any art asset pool could vary from having one art asset unit to hundreds or thousands of art asset pools units. This invention could allow one group of investors to purchase a single ownership unit for an art asset pool or several ownership units from various pools. The mechanics of such a dynamic arrangement could allow cash flow to museums to exist while giving investors the opportunity to produce a stream of income in the form of dividends or other sources from his or her investment in the art asset pools pool. Other income streams could include reproductions of the art held in the art asset pool, leasing of the art asset, or trading the art asset pools upon maturity. The ownership of the art asset pools could be a minority position, majority or full ownership. This invention also includes the CCM system's ability to manage ownership percentage for the single unit within the art asset pools pool. In other words, each ownership unit within a pool could have a differing ownership makeup depending on the goals of the original art asset pools owners and the Pool Manager.

Upon a pre-defined maturation of any art asset pool, the Pool Manager has several options, including having the CCM system terminate the pool, maintain the pool, form a new pool, or adjust the existing pool by adding or deleting art assets within the pool.

In light of the foregoing, as illustrated in FIG. 13, one embodiment of this invention could include an art asset pool containing precious metals, rare coins, gold bullion, gemstones or other art assets. As shown in FIG. 13, the CCM system could be programmed to use the assets within this art asset pool as a switching agent in order to purchase, convert or exchange with other (or, secondary) art assets in order maximize investor value throughout the world. In this regard, the switching method achieved through the CCM system is adapted to automatically convert, for example, an art asset that has increased in value in order to exchange for an art asset that is believed to be undervalued.

Thus, in yet another example, the CCM system may be programmed to create a gold art asset pool (bullion, coins or other precious metals, etc.), and when the CCM system triggers a triggering threshold event due to underperformance, the CCM system could be programmed to automatically switch (or, liquidate) the gold art asset pool in to another higher-performing art asset pool (such as, for example, another type of art asset pool having precious metals such as platinum) when the platinum is calculated by the CCM software as increasing in value. The CCM software may then designate the precious metals art asset pool, in this example, as the new switching agent. Subsequently, as the price for the precious metals art asset pool increases, the CCM system could then be programmed, upon a triggering threshold event, to sell a portion or all of the ownership units of the precious metals art asset pool, or exchanged to another art asset pool (containing, for example, gold and or other precious metals or some other art assets). Art generally only enjoys a peripheral place in the world of financial markets. Gold and platinum, on the other hand, are central to the financial markets. Implementing precious metals as switching agents with other art asset pools, helps to solidify liquidity and stability to owners (such as museums) as well as private collectors of all genres.

Portfolio owners will discover the benefits from the diversity of options provided in the created investment pools, combined with unique switching agents, to provide portfolio safety, growth and profitability. Art and precious metal assets, when combined, create new investment opportunities that are tangible and thus safer for the investor. Art asset pools which have inherent switching capabilities enhanced by bullion or other commodity or rarity switching agents broaden the art asset ownership base, which intern produces a new and necessary liquidity in the proven and highly valued art assets market. The CCM system's capability of automatically determining a buying/selling cycle between assets takes advantage of the inverse market value relationships between various art asset pools. The Pool Manager could use any type and form of investment vehicle or any type of art asset as a switching agent in order to maximize the value of the exchanges made, thereby returning an acceptable return on investment to the art investor. As each art asset pool evolves in time and secondary markets develop, the issue of lack of liquidity which prevents most investments from being widely accepted by the general investing public should disappear. At the point of transition from an appraisal driven approach to a market driven approach, the asset pool may become a part of many art asset portfolios.

The CCM system may also create and manage exclusive art asset pools should the demand arise to accommodate a particular interest or trend for a specific collectable art asset. Internal trading agreements could be formed and managed by the CCM system which would again create the potential of one investor having the lions share or exclusive ownership of the asset within the pool. Exclusive art asset pools would re-introduce sole art asset ownership capabilities, which would be able to remain in the exclusive pool should the sole owner desire for future liquidity, or the pool maybe dissolved. The CCM system's ability to create and manage exclusive art asset pools would bring art asset ownership full circle from exclusive ownership to diversified ownership which creates liquidity and back to exclusive ownership.

The present invention creates a dynamic buy-sell environment for art assets over a network throughout the world which utilizes the typically non-utilized art assets in a way that creates demand and appreciation, while concurrently having little or no change or impact on the control and use of the actual art asset.

Preferably, the CCM system is adapted to control any risk management associated with the art asset pool, to raise capital through ownership shares associated with the art asset pool, provide the requisite verifications for buying, selling and ownership of the art asset pool, and provide proper insurance coverage for each art asset or art asset pool prior to any public offering. Of course, the CCM system may also be adapted to maintain all records required by any local, state, federal, international or foreign government agency (such as, for example, the United States Securities and Exchange Commission, the London Stock Exchange, etc.).

The present invention significantly differs from the current investment vehicles in place in that it utilizes a variety of hybrid investment vehicles that enable the Pool Manager to provide scalability of investment risk associated with the art asset pools as well as the ability to differentiate various art assets into various pools as described by offering memorandums in the field and based on other market conditions. These market conditions are based on the acceptable mechanism and standard derived by this invention as later described. As described earlier, the CCM system may be programmed to continuously (or, approximately continuously) provide a comparison over time between appraisal information and current market value to generate a new appraisal value. Of course, this re-appraisal process can vary from daily, monthly, quarterly, annually and in any other time lots appropriate for the most accurate art asset valuation.

While the scope of the present invention should not be limited to any particular theory of operation, it should be instructive to speculate on such in order to provide the reader with a full understanding of this invention and its preferred embodiment. Other variations and modifications of the present invention will be apparent to those of ordinary skill in the art, and it is the intent of the appended claims that such variations and modifications be covered. The particular values and configurations discussed above can be varied, are cited to illustrate representative embodiments of the present invention and are not intended to limit the scope of the invention. It is contemplated that the use of the present invention can involve components having different characteristics as long as the principles disclosed herein are followed.

The invention claimed is:

1. A method for obtaining, maintaining and controlling an exchange for tangible assets over a global computer network, the method comprising the steps of:
   introducing at least one secure central control manager computer system in secure electronic communication with remote computer systems over the global computer network;
   programming the central control manager computer system to initially identify, create and store one or more art assets;

allowing the central control manager computer system to create and store one or more art asset pools based upon each art asset, the central control manager computer system characterizing and storing pool information corresponding to each pool created;

adapting the central control manager computer system to identify, obtain and store one or more approximate appraisal values, authenticity data and appraisal-related data for each art asset within each art asset pool, and based upon the approximate appraisal values, allowing the central control manager computer system to calculate, store and display a dynamic art asset appraisal value;

programming the central control manager computer system to generate recommendations relating to buying, selling or maintaining ownership interests in each art asset pool;

for each art asset pool created, allowing the central control manager computer system to create a pre-defined number of ownership units, and allowing the central control manager computer system to create an initial ownership price per unit corresponding to asset appraisal values;

programming the central control manager computer system to create, manage and coordinate ownership interests of each art asset pool created;

adapting the central control manager computer system to create and transmit an initial price offering communication to one or more potential art investors over the global computer network at a pre-defined time, the initial price offering communication including a description of the art asset pool and the initial ownership price per unit;

allowing the central control manager computer system to securely receive and transact orders from the potential art investors;

programming the central control manager computer system to continuously and dynamically identify and store art asset pool values to determine whether the art asset pool value is increasing, decreasing or maintaining an approximately constant value; and allowing the central control manager computer system to switch ownership units amongst art asset pools based upon a pre-defined triggering threshold event.

2. The method of claim 1 wherein the step of adapting the central control manager computer system to identify and obtain one or more approximate appraisal values for each art asset within the art asset pool further comprises the step of allowing the central control manager computer system to poll appraisal databases over the global computer network to obtain third party appraisal values.

3. The method of claim 2 wherein the step of adapting the central control manager computer system to identify and obtain one or more approximate appraisal values for each art asset within the art asset pool further comprises the step of allowing remote computer systems to provide appraisal data to the central control manager computer system through the global computer network.

4. The method of claim 2 wherein the step of adapting the central control manager computer system to identify and obtain one or more approximate appraisal values for each art asset within the art asset pool further comprises the step of allowing the central control manager computer system to define an appraisal value based upon the average of all collected appraisal values.

5. The method of claim 1 further comprising the step of allowing the central control manager computer system to re-evaluate the appraisal data obtained to generate an approximately real-time or concurrent time appraisal value.

6. The method of claim 1 wherein the central control manager computer system is programmed to classify each art asset pool from the group selected of:
single source art assets, multiple source art assets, variable risk art assets, multiple risk art assets, related art assets, single art assets, diversified art assets, time-based art assets and hybrid art assets.

7. The method of claim 1, the pool information comprising a title of the art asset, a description of the original of the art asset, a historical description of the art asset, a physical location of the art asset, a physical description of the art asset, an age description of the art asset, a description of the environmental characteristics in which the art asset is being stored, and a list of one or more owners of the art asset.

8. The method of claim 1 wherein the step of programming the central control manager computer system to continuously and dynamically identify and store art asset pool values to determine whether the art asset pool value is increasing, decreasing or maintaining an approximately constant value further comprises the steps of programming the central control manager computer system to continuously compare historical appraisal information for each art asset pool with one or more market driven values obtained in approximately or concurrently real time to thereby generate dynamic market information, and allowing the central control manager computer system to electronically transmit the dynamic market information to potential art investors.

9. The method of claim 1 wherein the central control manager computer system is further adapted to create and electronically transmit an event notification upon the identification of the pre-programmed triggering threshold event.

10. The method of claim 1 further comprising the step of programming the central control manager computer system to electronically display art asset account information pertaining to each art asset pool, display photos of each asset in the pool, generate performances of the pool, obtain secondary market information, obtain pool directories, prospectuses, offering memorandum and like information regarding each art asset pool.

11. The method of claim 10 wherein the central control manager computer system is further adapted to electronically generate risk assessment information for each art asset and for each art asset pool.

12. The method of claim 1 wherein the triggering threshold event is based upon a multiple of quantitative and qualitative data calculated by the central control manager computer system.

13. The method of claim 1 wherein the triggering threshold event is based upon a pre-defined standard deviation value calculated by the central control manager computer system.

14. The method of claim 1 further comprising the step of programming the central control manager computer system to coordinate, identify and manage the governance of each art asset within each art asset pool.

15. The product according to the method of claim 1.

16. A system for creating and maintaining an art asset exchange over a global computer network, the system comprising at least one encryptable central control manager computer in secure electronic communication with remote computers over the global computer network, the central control manager computer being programmed to:
identify, create and store one or more art assets in a database, to create, store and manage at least one art asset pool containing one or more of the art assets based on a pre-defined criteria;
identify, store and display a dynamic art asset appraisal value;

create a pre-defined number of ownership units for each art asset pool created, and approximately concurrently create an initial ownership price per unit corresponding to the dynamic art asset appraisal value;

create and transmit an asset marketization communication to one or more potential art investors over the global computer network, and subsequently securely receive and transact orders from the potential art investors;

dynamically identify, store and compare art asset pool values to determine whether the art asset pool value is increasing, decreasing or maintaining an approximately constant value; and automatically switch ownership units amongst art asset pools based upon a pre-defined triggering threshold event.

17. The system of claim 16 wherein the central control manager computer is further programmed to electronically obtain and electronically transmit art asset and art asset pool information over the global computer network.

18. The system of claim 17 wherein the central control manager computer is further programmed to automatically switch art assets amongst art asset pools based upon a pre-programmed triggering threshold event.

19. The system of claim 16 wherein the central control manager computer is further programmed to dynamically re-evaluate the appraisal data obtained for each art asset and for each art asset pool in order to generate an approximately real-time appraisal value.

20. The system of claim 16 wherein the central control manager computer is further programmed to continuously compare historical appraisal information with at least one market driven value obtained to thereby generate dynamic market information, the central control manager computer being programmed to electronically transmit the dynamic market information to potential art investors.

21. The system of claim 16 wherein the central control manager computer is further programmed to generate risk assessment information for each art asset and for each art asset pool.

22. The system of claim 16 wherein the central control manager computer is further programmed to coordinate, identify and manage the governance of each art asset within each art asset pool.

23. A secure art asset exchange system in communication with a global computer network, the system comprising a central control manager computer in communication with the global computer network, the central control manager computer programmed to:

generate, characterize and store at least one art asset in a database, place each art asset in a pre-defined art asset pool, and assign a pre-determined number of ownership units to the art asset pool;

appraise each art asset and each art asset pool, place each art asset in to an art asset pool for asset marketization, generate dynamic market information based upon a comparison of one or more art asset appraisals with one or more art asset market demands, and dynamically determine whether any art asset pool is increasing, decreasing or maintaining an approximately constant value; and automatically switch ownership units amongst art asset pools based upon a pre-defined triggering threshold event.

24. The system of claim 23 wherein the central control manager computer is further programmed to automatically switch art assets amongst art asset pools based upon a pre-programmed triggering threshold event.

25. The system of claim 24 wherein the central control manager computer is further programmed to dynamically re-evaluate the appraisal data obtained for each art asset and for each art asset pool in order to generate an approximately real-time appraisal value.

26. The system of claim 25 wherein the central control manager computer is further programmed to continuously compare historical appraisal information with at least one market driven value obtained to thereby generate dynamic market information, the central control manager computer system being programmed to electronically transmit the dynamic market information to potential art investors.

27. The system of claim 26 wherein the central control manager computer is further programmed to generate risk assessment information for each art asset and for each art asset pool.

* * * * *